(12) United States Patent
Shah

(10) Patent No.: US 11,270,263 B2
(45) Date of Patent: Mar. 8, 2022

(54) BLOCKCHAIN-BASED CROWDSOURCED INITIATIVES TRACKING SYSTEM

(71) Applicant: Netspective Communications LLC, Silver Spring, MD (US)

(72) Inventor: Shahid N. Shah, Silver Spring, MD (US)

(73) Assignee: Netspective Communications LLC, Silver Spring, MD (US)

( * ) Notice: Subject to any disclaimer, the term of this patent is extended or adjusted under 35 U.S.C. 154(b) by 864 days.

(21) Appl. No.: 15/587,202

(22) Filed: May 4, 2017

(65) Prior Publication Data
US 2017/0236094 A1 Aug. 17, 2017

Related U.S. Application Data

(63) Continuation-in-part of application No. 14/025,493, filed on Sep. 12, 2013, now abandoned.

(51) Int. Cl.
*G06Q 10/10* (2012.01)
*H04L 9/06* (2006.01)
(Continued)

(52) U.S. Cl.
CPC ......... *G06Q 10/101* (2013.01); *G06Q 10/063* (2013.01); *G06Q 20/36* (2013.01);
(Continued)

(58) Field of Classification Search
CPC .... G06Q 10/101; G06Q 20/36; G06Q 10/063; G06Q 30/0206; G06Q 30/0203;
(Continued)

(56) References Cited

U.S. PATENT DOCUMENTS 5,706,452 A 1/1998 Ivanov
6,452,613 B1 9/2002 Lefebvre et al.
(Continued)

OTHER PUBLICATIONS

Burstall, R. and Clark, B., "Blockchain, IP and the Fashion Industry" (Mar. 23, 2017) Managing Intellectual Property (6 pages), accessed at: https://www.managingip.com/Article/3667444/Blockchain-IP-and-the-fashion-industry.html (Year: 2017).*
(Continued)

*Primary Examiner* — Shelby A Turner
(74) *Attorney, Agent, or Firm* — Rahman LLC

(57) ABSTRACT

An embodiment herein provides a blockchain configured crowdsourced initiatives exchange ecosystem that includes a plurality of computing terminals associated with respective plurality of innovators which serve as sources of initiatives identified as innovations and respective sub-innovations. The ecosystem includes a distributed trusted ledgers system, a computing device communicatively connected to the plurality of computing terminals and configured to access the plurality of computing terminals and monitor the innovations, and a processing circuit that includes an initiatives tracking device that tracks the innovations associated with the plurality of computing terminals. The processing circuit includes a central initiatives management device. The ecosystem includes a hardware-based identity validation appliance to verify integrity of the plurality of computing terminals and the associated innovators to authorize a secured access of the plurality of computing terminals and to associate metadata with the innovations defining a digital ownership identity, a digital time identity, a digital geographical identity.

13 Claims, 10 Drawing Sheets

(51) Int. Cl.
*G06Q 50/00* (2012.01)
*G06Q 50/18* (2012.01)
*G06Q 30/02* (2012.01)
*H04L 9/32* (2006.01)
*G06Q 10/06* (2012.01)
*G06Q 20/36* (2012.01)

(52) U.S. Cl.
CPC ..... *G06Q 30/0203* (2013.01); *G06Q 30/0206* (2013.01); *G06Q 50/01* (2013.01); *G06Q 50/184* (2013.01); *H04L 9/0637* (2013.01); *H04L 9/3236* (2013.01); *G06Q 2220/00* (2013.01); *H04L 2209/38* (2013.01); *H04L 2209/56* (2013.01)

(58) Field of Classification Search
CPC .. G06Q 50/184; G06Q 50/01; G06Q 2220/00; H04L 9/3236; H04L 9/0637; H04L 2209/56; H04L 2209/38
See application file for complete search history.

(56) References Cited

U.S. PATENT DOCUMENTS

| | | | |
|---|---|---|---|
| 6,654,767 B2 | 11/2003 | McAnaney et al. | |
| 7,366,919 B1 * | 4/2008 | Sobel | H04L 51/12 |
| 7,801,830 B1 | 9/2010 | Frank et al. | |
| 8,280,882 B2 | 10/2012 | Troy et al. | |
| 8,332,740 B2 * | 12/2012 | Graham | G06Q 50/184 |
| | | | 715/200 |
| 8,666,436 B2 * | 3/2014 | Ellanti | H04M 3/42348 |
| | | | 455/457 |
| 8,843,997 B1 * | 9/2014 | Hare | H04L 63/0281 |
| | | | 709/200 |
| 9,307,034 B1 * | 4/2016 | Keyani | H04W 12/02 |
| 9,418,355 B2 * | 8/2016 | Shah | G06Q 50/01 |
| 9,785,764 B2 * | 10/2017 | Loughlin-Mchugh | |
| | | | G06F 21/35 |
| 9,853,959 B1 * | 12/2017 | Kapczynski | H04L 63/08 |
| 9,870,591 B2 * | 1/2018 | Shah | H04L 9/32 |
| 10,438,170 B2 * | 10/2019 | Kozloski | G06Q 10/101 |
| 2001/0032189 A1 * | 10/2001 | Powell | G06Q 10/10 |
| | | | 705/59 |
| 2001/0039505 A1 | 11/2001 | Cronin | |
| 2002/0161605 A1 * | 10/2002 | Newman | G16H 40/20 |
| | | | 705/2 |
| 2006/0129421 A1 | 6/2006 | Matveev | |
| 2006/0161353 A1 | 7/2006 | Mascarenhas | |
| 2006/0161456 A1 * | 7/2006 | Baker | G16Z 99/00 |
| | | | 705/2 |
| 2008/0040355 A1 | 2/2008 | Martinez et al. | |
| 2008/0271109 A1 * | 10/2008 | Singh | H04L 63/102 |
| | | | 726/1 |
| 2008/0281616 A1 * | 11/2008 | Johnson | G06Q 10/00 |
| | | | 705/1.1 |
| 2009/0019552 A1 * | 1/2009 | McLaughlin | G16H 10/60 |
| | | | 726/27 |
| 2009/0027223 A1 * | 1/2009 | Hill | G06Q 30/02 |
| | | | 340/686.6 |
| 2009/0216589 A1 | 8/2009 | Ricci | |
| 2009/0276296 A1 | 11/2009 | Spriegel | |
| 2010/0010874 A1 | 1/2010 | Howard et al. | |
| 2010/0161507 A1 * | 6/2010 | McKenzie, III | G01S 5/0027 |
| | | | 705/347 |
| 2010/0161718 A1 * | 6/2010 | Soelberg | H04L 67/18 |
| | | | 709/203 |
| 2010/0174662 A1 | 7/2010 | Fabella, Jr. et al. | |
| 2010/0205025 A1 | 8/2010 | Johansen | |
| 2010/0266213 A1 * | 10/2010 | Hill | A61B 5/16 |
| | | | 382/218 |
| 2012/0002848 A1 * | 1/2012 | Hill | A61B 5/164 |
| | | | 382/118 |
| 2012/0158668 A1 | 6/2012 | Tu et al. | |
| 2013/0035974 A1 | 2/2013 | Ray et al. | |
| 2013/0204652 A1 | 8/2013 | Marins et al. | |
| 2013/0282504 A1 * | 10/2013 | Lessin | G06Q 30/02 |
| | | | 705/26.1 |
| 2013/0325704 A1 * | 12/2013 | Gorman | G06Q 50/265 |
| | | | 705/39 |
| 2013/0326346 A1 | 12/2013 | Zhu et al. | |
| 2014/0075004 A1 | 3/2014 | Van Dusen et al. | |
| 2014/0317003 A1 * | 10/2014 | Shah | G06Q 30/018 |
| | | | 705/317 |
| 2014/0337948 A1 * | 11/2014 | Hoyos | G06K 9/46 |
| | | | 726/7 |
| 2015/0059003 A1 * | 2/2015 | Bouse | G06F 16/2228 |
| | | | 726/28 |
| 2015/0073870 A1 * | 3/2015 | Shah | G06Q 30/0203 |
| | | | 705/7.32 |
| 2015/0213634 A1 * | 7/2015 | Karmarkar | A61B 5/163 |
| | | | 345/589 |
| 2015/0293897 A1 * | 10/2015 | Myslinski | G06Q 10/06 |
| | | | 707/755 |
| 2016/0283920 A1 * | 9/2016 | Fisher | G06Q 20/02 |
| 2016/0323109 A1 * | 11/2016 | McCoy | G06Q 50/184 |
| 2017/0011195 A1 * | 1/2017 | Arshad | G16H 40/20 |
| 2017/0039330 A1 * | 2/2017 | Tanner, Jr. | G06Q 10/00 |
| 2017/0134161 A1 * | 5/2017 | Goeringer | H04L 63/0428 |
| 2017/0193619 A1 * | 7/2017 | Rollins | G06Q 50/184 |
| 2018/0082024 A1 * | 3/2018 | Curbera | H04L 9/0637 |
| 2018/0115540 A1 * | 4/2018 | Moiyallah, Jr. | H04L 63/08 |
| 2018/0285996 A1 * | 10/2018 | Ma | G06F 16/2428 |

OTHER PUBLICATIONS

Cawrey, D. "How Bitcoin's Technology Could Revolutionize Intellectual Property Rights" (May 8, 2014) Coindesk (5 pages), accessed at: https://www.coindesk.com/how-block-chain-technology-is-working-to-transform-intellectual-property (Year: 2014).*

T. Aste, p. Tasca and T. Di Matteo, "Blockchain Technologies: The Foreseeable Impacton Society and Industry," in Computer, vol. 50, No. 9, pp. 18-28, 2017, doi: 10.1109/MC.2017.3571064. (Year: 2017).*

D. Patel, J. Bothra and V. Patel, "Blockchain exhumed," 2017 ISEA Asia Security and Privacy (ISEASP), 2017, pp. 1-12, doi: 10.1109/ISEASP.2017.7976993 (Year: 2017).*

* cited by examiner

BLOCKCHAIN-BASED CROWDSOURCED INITIATIVES TRACKING SYSTEM

CROSS-REFERENCE TO RELATED APPLICATIONS

This application is a continuation-in-part of U.S. patent application Ser. No. 14/025,493 filed on Sep. 12, 2013, the complete disclosure of which, in its entirety, is herein incorporated by reference.

BACKGROUND

Technical Field

The embodiments herein generally relate to blockchain systems, and in particular to trusted blockchain systems for crowdsourced tracking, developing, evaluation, and scoring of innovations and sub-innovations in a distributed technological ecosystem.

Description of the Related Art

Many organizations and agencies give financial aids and rewards such as grants etc. for valuable ideas. However, in many of the cases, the organizations are not always sure about how to choose the most valuable ideas out of a set of innumerable ideas submitted for evaluation. This makes the evaluation process difficult for these organizations. Further, companies generally have a difficult time in tracking and/or developing valuable and creative global innovations and initiatives.

SUMMARY

In view of the foregoing, an embodiment herein provides a blockchain configured distributed architecture-based crowdsourced initiatives exchange ecosystem. The crowdsourced initiatives exchange ecosystem includes a plurality of computing terminals associated with respective plurality of innovators which serve as sources of initiatives identified as innovations and respective sub-innovations stored in the form of computer executable files at the computing terminals of the innovators. The plurality of computing terminals are communicatively connected over a crowdsourced initiatives exchange network.

The crowdsourced initiatives exchange ecosystem includes a distributed trusted ledgers system containing a plurality of distributed blockchain ledgers associated with the plurality of computing terminals such that each ledger stores a copy of the computer executable files containing the innovations and trust notes for defining security and trust among the computing terminals so that each computing terminal trusts the other computing terminal through blockchain. The distributed ledgers system enable coding of rules-based contracts that execute when specified conditions are met. The crowdsourced initiatives exchange ecosystem includes a computing device communicatively connected to the plurality of computing terminals through the crowdsourced initiatives exchange network and configured to access privately the computer executable files stored at the plurality of computing terminals as the blockchain ledgers to source and monitor the innovations from an external system.

The crowdsourced initiatives exchange ecosystem includes a processing circuit communicatively coupled to the computing device and the plurality of computing terminals. The processing circuit includes an initiatives tracking device that tracks the innovations in the crowdsourced initiatives exchange network by accessing the distributed ledgers associated with the plurality of computing terminals such that the ledgers allow the computing device to review the computer executable files privately. The processing circuit further includes a central initiatives management device that includes an evaluation device for evaluating the innovations based on one or more inputs. The one or more inputs are determined using a credentialed score of an innovator, a crowdsourcing index, a referencing index, an inventor reputation criterion, degree of overlap with a sub-innovation. The crowdsourcing index comprises a non-linear relationship with a number of crowdsource respondents, and the referencing index signifies connections of the innovation with other references. The central initiatives management device includes a scoring device for associating an innovation score to each of the innovations based on an evaluation output. The crowdsourced initiatives exchange ecosystem includes a memory device containing an enterprise asset library to store the computer executable files tracked and extracted from the computing terminals and indicative of the innovations including computer executable initiatives documents, computer executable invention disclosures, computer executable innovator profiles, computer executable innovator credentialing details, the computer executable evaluation output, and the computer executable associated scores.

The crowdsourced initiatives exchange ecosystem includes a hardware-based identity validation appliance to verify integrity of the plurality of computing terminals and the associated innovators to authorize a secured and private access of the plurality of computing terminals to the crowdsourced initiatives exchange network and to associate metadata with the innovations defining a digital ownership identity, a digital time identity, a digital geographical identity. The hardware-based identity validation appliance includes a geo-spatial mapping device to perform geo-tagging of the computing terminals and the computer executable files and compare the geo-tags with pre-stored geo-spatial information about the innovators for processing validation. The geo-tagging is performed based on geo-spatial information received from a global positioning system (GPS)-based device from the respective computing terminals in the form of electric signals. The crowdsourced initiatives exchange ecosystem includes a digital acquisition unit and multichannel amplifiers operatively coupled to the geo-spatial mapping device and communicatively connected to the GPS-based device and configured for pre-processing and amplification of the electric signals received from the GPS-based device.

The ecosystem may include a web platform including a graphical user interactive interface accessible through the computing device. The initiatives tracking device may track sub-innovations for an innovation by removing one or more elements or attributes from the innovation such that the sub-innovations have at least one element reduced from the innovation and results in a tangible product that is different from the innovation in at least one of a physical property, a chemical property, and a biological property. The initiatives tracking device may track sub-innovations for an innovation by adding dissimilar and unrelated attributes or elements with the innovation such that the sub-innovations have at least one element or attribute added to the innovation and results in a tangible product that is different from the innovation in at least one of a physical property, a chemical property, and a biological property.

The initiatives tracking device may track sub-innovations for an innovation by copying attributes or elements of the innovation and making alterations into it to result in a sub-innovation that is different from the innovation in at least one of a physical property, a chemical property, and a biological property. The initiatives tracking device may track sub-innovations for an innovation by eliminating attributes or elements of the innovation and rearranging them to result in a sub-innovation that is different from the innovation in at least one of a physical property, a chemical property, and a biological property, and wherein the rearrangement is of a physical or a chemical type such that a physical rearrangement results in a different physical product from the innovation and a chemical rearrangement results in a different molecule or compound from the innovation. The memory device may be configured to store programmed instructions that perform defined tasks of elimination, unification, and rearrangement within one or more attributes or elements of an innovation to derive a plurality of sub-innovations.

The derived sub-innovations may include a first sub-innovation derived from the innovation based on a first similarity relationship and a second sub-innovation derived from the first sub-innovation based on a second similarity relationship. The first similarity relationship and the second similarity relationship may be different. The derived sub-innovations may further include a third sub-innovation derived from the second sub-innovation based on a third similarity relationship between the second sub-innovation and the third sub-innovation such that the third similarity relationship may be different from the first and the second similarity relationships. The innovation, first sub-innovation, second sub-innovation, and the third sub-innovation are non-obvious and novel among themselves.

The ecosystem may include a mapping system that may develop an initiatives digital map including the innovation and the sub-innovations along with their similarity relationships to define relationship trends. The processing circuit may be configured to track the innovations from the external system not belonging to or integrated with the computing device by reading the distributed ledgers privately accessible by the computing device. The processing circuit may be further configured to develop one or more sub-innovations of the innovations using a set of computer-controlled operations. The processing circuit may be configured to track the one or more sub-innovations by reading the distributed ledgers associated with the plurality of computing terminals. The set of computer-controlled operations may be configured to change configurations of the innovations in at least one of attributes or elements such that resulting sub-innovations may be different from the innovations in at least a category comprising any of a physical property, a chemical property, and a biological property, and wherein respective sub-innovations may be derived by any of eliminating, unifying, or rearranging attributes or elements in the respective innovations.

In an example, each innovation and its respective sub-innovations may be defined through a computer executable data structure stored in the form of a computer executable file such that the computer executable data structure may associate a digital relationship between an innovation and its respective sub-innovations through relational structures maintained in the distributed trusted ledgers. The identity validation appliance may further include a facial expression based validation device to receive data indicative of micro facial expressions extracted by respective facial expressions sensors associated with the computing terminals of the innovators. The micro expressions based validation device may include an image processing circuitry and an associated memory to interpret the micro facial expressions and compare them with predefined facial patterns to validate an identity of the innovators.

The ecosystem may further include a credentialing system configured to determine the credentialed score of the innovators and the crowdsourcing index. The credentialing system may include a profile segmenting engine configured to segment digital profiles of the innovators into federated digital profiles associated with each of the innovators. The credentialing system may include a segment certification engine configured to facilitate certification of the federated digital profiles associated with the innovators through a plurality of digital nodes representing crowdsourced respondents networked together in a digital architecture. The credentialing system may include a segment rating engine configured to associate ratings to credentialed federated profiles. The credentialing system may include a profile rating engine configured to determine the credentialed score and associate with the respective profiles of the innovators based on the ratings. The score may be used by the evaluation device for evaluating identity of the innovators and respective innovations.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION

Figure 1:
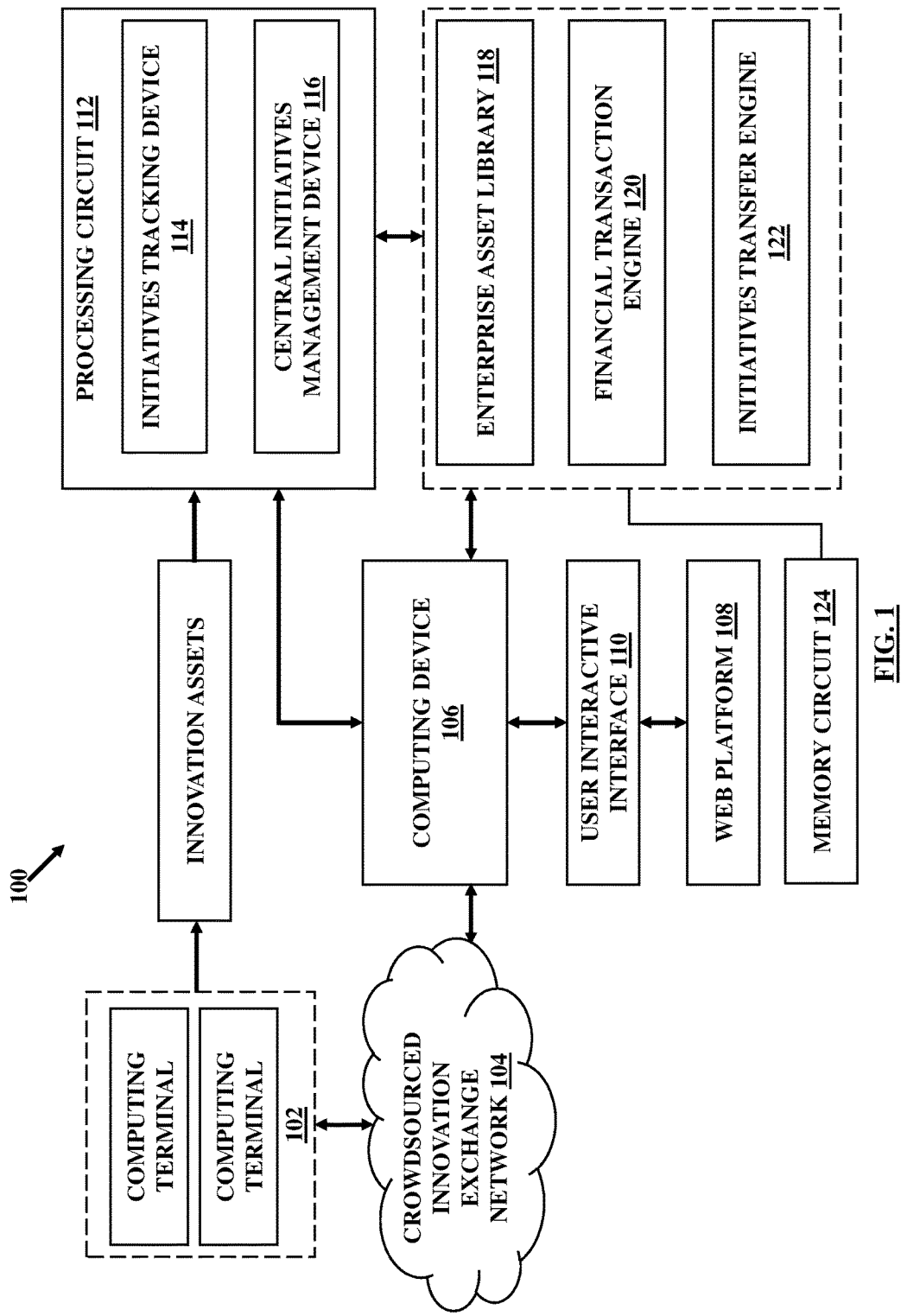
FIG. 1 illustrates generally, but not by way of limitation, an exemplary computerized ecosystem in which various embodiments may operate.

The embodiments herein and the various features and advantageous details thereof are explained more fully with reference to the non-limiting embodiments that are illustrated in the accompanying drawings and detailed in the following description. Descriptions of well-known components and are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

In the following detailed description, reference is made to the accompanying drawings that form a part hereof, and these are shown by way of illustrating specific embodiments herein that may be practiced. These embodiments, which are also referred to herein as "examples," are described in sufficient detail to enable those skilled in the art to practice the embodiments herein, and it is to be understood that the embodiments may be combined, or that other embodiments may be utilized and that structural, logical, and electrical changes may be made without departing from the scope of the embodiments herein.

In this document, the terms "a" or "an" are used, as is common in patent documents, to include one or more than one. In this document, the term "or" is used to refer to a "nonexclusive or" unless otherwise indicated.

In an exemplary embodiment, the various modules described herein and illustrated in the figures are embodied as hardware-enabled modules and may be configured as a plurality of overlapping or independent electronic circuits, devices, and discrete elements packaged onto a circuit board to provide data and signal processing functionality within a computer. An example might be a comparator, inverter, or flip-flop, which could include a plurality of transistors and other supporting devices and circuit elements. The modules that are configured with electronic circuits process computer logic instructions capable of providing digital and/or analog signals for performing various functions as described herein. The various functions may further be embodied and physically saved as any of data structures, data paths, data objects, data object models, object files, database components. For example, the data objects could be configured as a digital packet of structured data. The data structures could be configured as any of an array, tuple, map, union, variant, set, graph, tree, node, and an object, which may be stored and retrieved by computer memory and may be managed by processors, compilers, and other computer hardware components. The data paths may be configured as part of a computer CPU that performs operations and calculations as instructed by the computer logic instructions. The data paths could include digital electronic circuits, multipliers, registers and buses capable of performing data processing operations and arithmetic operations (e.g., Add, Subtract, etc.), bitwise logical operations (AND, OR, XOR, etc.), bit shift operations (e.g., arithmetic, logical, rotate, etc.), complex operations (e.g., using single clock calculations, sequential calculations, iterative calculations, etc.). The data objects may be configured as physical locations in computer memory and may be a variable, a data structure, or a function. In the embodiments configured as relational databases (e.g., such Oracle® relational databases), the data objects may be configured as a table or column. Other configurations include specialized objects, distributed objects, object oriented programming objects, and semantic web objects, for example. The data object models may be configured as an application programming interface for creating HyperText Markup Language (HTML) and Extensible Markup Language (XML) electronic documents. The models may be further configured as any of a tree, graph, container, list, map, queue, set, stack, and variations thereof. The data object files are created by compilers and assemblers and contain generated binary code and data for a source file. The database components may include any of tables, indexes, views, stored procedures, and triggers.

FIG. 1 illustrates an example of a distributed architecture of a computerized initiatives exchange ecosystem 100. The ecosystem 100 includes a plurality of crowdsourced innovators associated with a plurality of computing terminals 102 operatively connected with a crowdsourced initiatives exchange network 104. The initiatives exchange ecosystem 100 is configured to track or develop initiatives in the crowdsourced innovation exchange network 104 which may exist in the form of computer executable files stored at the various computing terminals associated with the innovators. The initiatives may include innovations and sub-innovations defined in the form of computer executable files. The tracking of innovations or initiatives may include tracking or developing of sub-innovations based on parent innovations or other sub-innovations associated with the innovations. In some embodiments, each innovation tracks respective sub-innovations. In some embodiments, the ecosystem 100 may further perform tasks of innovation rating, milestones tracking and scoring. The ecosystem 100 may facilitate tracking of innovations and sub-innovations globally in a simplified and automated manner.

The ecosystem 100 includes a computing device (or computing system) 106 operatively connected to the crowdsourced initiatives exchange network 104. The computing device 106 may include systems such as desktop or laptop computers, workstation computer systems, server computer systems, networks of computer systems, personal digital assistants (PDAs), wireless communications devices, portable devices, or any other electronic data processing system. The computing device 106 may include hardware/software devices capable of computational tasks associated with tracking or developing or scoring or evaluating the initiatives as described below. These tasks may be performed through a stand-alone application, via a web browser graphical user interface (GUI), or via a Rich Internet Interface (RII). An embodiment herein may be implemented as computer software incorporated as part of the ecosystem 100. The ecosystem 100 further includes a web platform 108 accessible through a graphical user interactive interface 110 through the computing device 106. The computing device 106 may be communicatively connected to the plurality of computing terminals through the crowdsourced initiatives exchange network 104 and configured to access privately the computer executable files signifying the initiatives and stored at the plurality of computing terminals. The initiatives may include innovations and corresponding sub-innovations such that each innovation tracks sub-innovations and each innovation and its respective sub-innovations are defined through a computer executable data structure stored in the form of the computer executable files such that the computer executable data structure associates a digital relationship between an innovation and its respective sub-innovations through digital relational structures.

The computing device 106 is operatively connected to a processing circuit 112. The processing circuit 112 includes or is coupled to an initiatives tracking device 114 that develops or tracks sub-innovations corresponding to an innovation in the crowdsourced initiatives exchange network 104. The initiatives tracking device 114 tracks or develops initiatives such as innovations based on for example parent innovations to result in sub-innovations corresponding to the innovations. The initiatives tracking device 114 may utilize several types of algorithms and automated tools for enabling each innovation to track sub-innovations. The automated tools may for example perform tasks digitally or physically such as elimination, unifications, rearrangement etc. as described below.

The ecosystem 100 further includes a central initiatives management device 116. The central initiatives management device 116 performs various control and managing operations for the various innovations and tracked sub-innovations by each of the innovations. In an embodiment, the central initiatives management device 116 creates a collated list of computer executable files containing the initiatives, innovation documents, invention disclosures, innovators' profiles, manage details about credentialed expertise of each of the innovators digitally, classify initiatives under various technology or initiative classes, and maintain a record of the initiatives in an enterprise asset library 118 digitally. The enterprise asset library 118 serves as a knowledge repository for digitally storing information pertinent to the initiatives including the computer executable initiatives documents, invention disclosures, innovator profiles, innovator credentialing details, evaluation output corresponding to the initiatives, and the associated scores for innovations and sub-innovations tracked by each of the innovations. The innovation asset library 118 stores innovator profiles digitally, wherein each of the digital profiles comprises a common profile and a plurality of associated federated profiles for each common profile as described below.

The processing circuit 112 may further include or be coupled to a financial transaction engine 120. The financial transaction engine 120 may explore a plurality of target agency requirements for one or more initiatives within and outside the initiatives exchange network 104. The transaction engine 120 may further determine a degree of relevance of an initiative with the target agency requirements. The financial transaction engine 120 may determine a financial value of the initiative for the target agency based on financial assessments and calculations utilizing the degree of relevance and value of the initiatives as inputs among other inputs without limitations.

The processing circuit 112 may further include or be coupled to an initiatives transfer engine 122 for facilitating the transfer of rights associated with the initiatives once a financial transaction is settled between a target agency and an innovator or a service provider who may own the initiative.

Figure 2:
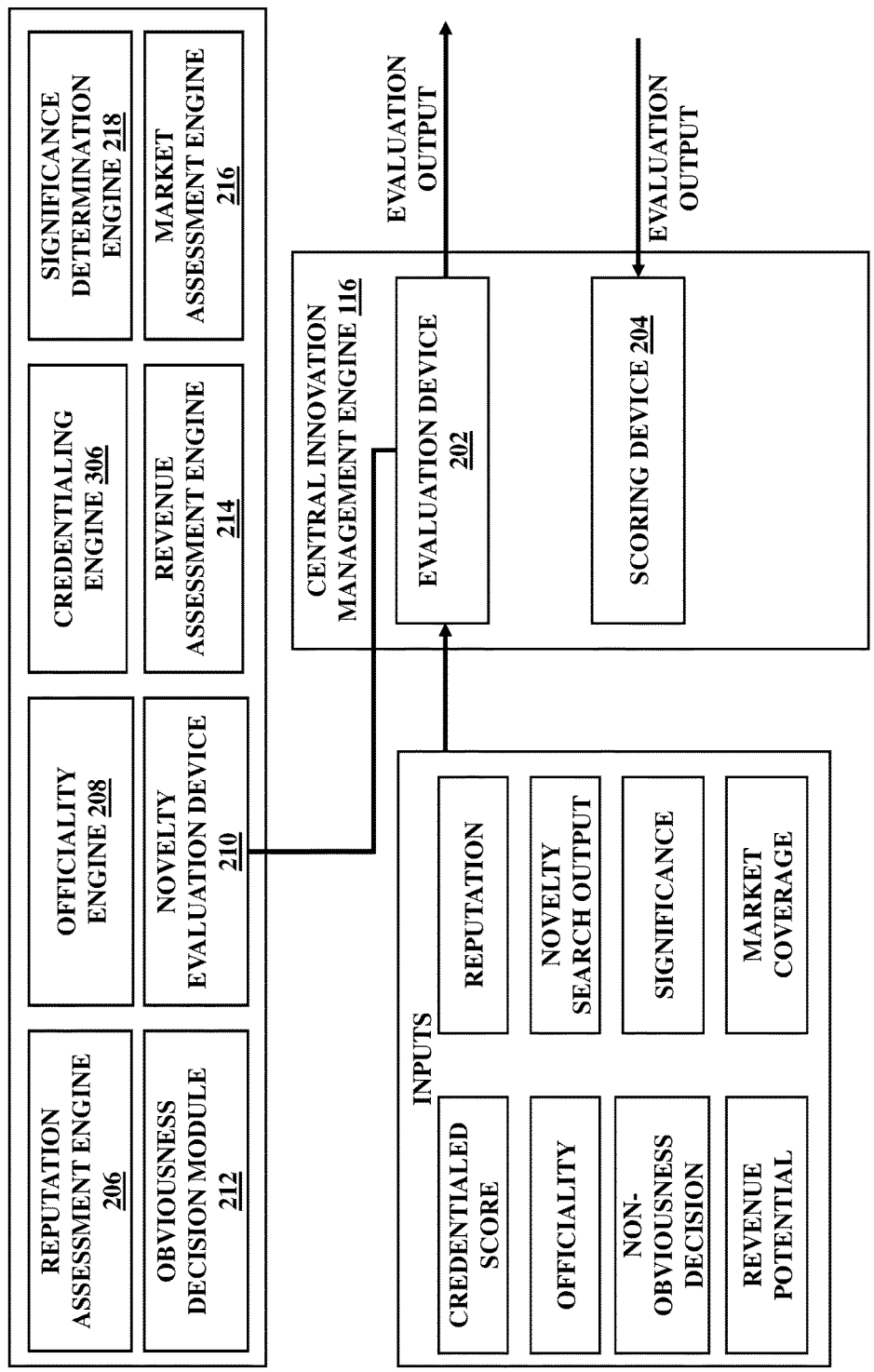
FIG. 2 illustrates an example of a computerized central initiatives management system in accordance with an embodiment herein.

FIG. 2, with reference to FIG. 1, illustrates an example of the central initiatives management device 116 among other things, in accordance with an embodiment herein. The central initiatives management device 116 includes an evaluation device 202 and a scoring device 204. The evaluation device 202 evaluates the computer executable files containing the initiatives based on one or more inputs. The inputs may include a credentialed score of an innovator, index of crowdsourcing, officiality of the innovator, and reputation of the innovator, novelty search output, non-obviousness decision, significance of the innovation for a target agency, revenue potential, and market coverage, and the like. The various inputs for determining the score of the innovator are discussed herein.

The crowdsourced credentialing may be indicative of a degree of credentialing by a plurality of respondents, for example it may be indicative of a score obtained by the expert or reviewer (such as an innovator) on the basis of credentialing of the expert or an expert profile by a plurality of respondents. The crowdsourcing index may be indicative of the level of crowdsourcing; that is, the number of respondents credentialing the expert (or the innovator). In an embodiment, the effect of crowdsourcing index for an expert may define a non-linear relationship between number of respondents credentialing an expert and a score of an expert thus obtained. For example, the relationship may be exponential.

Figure 3:
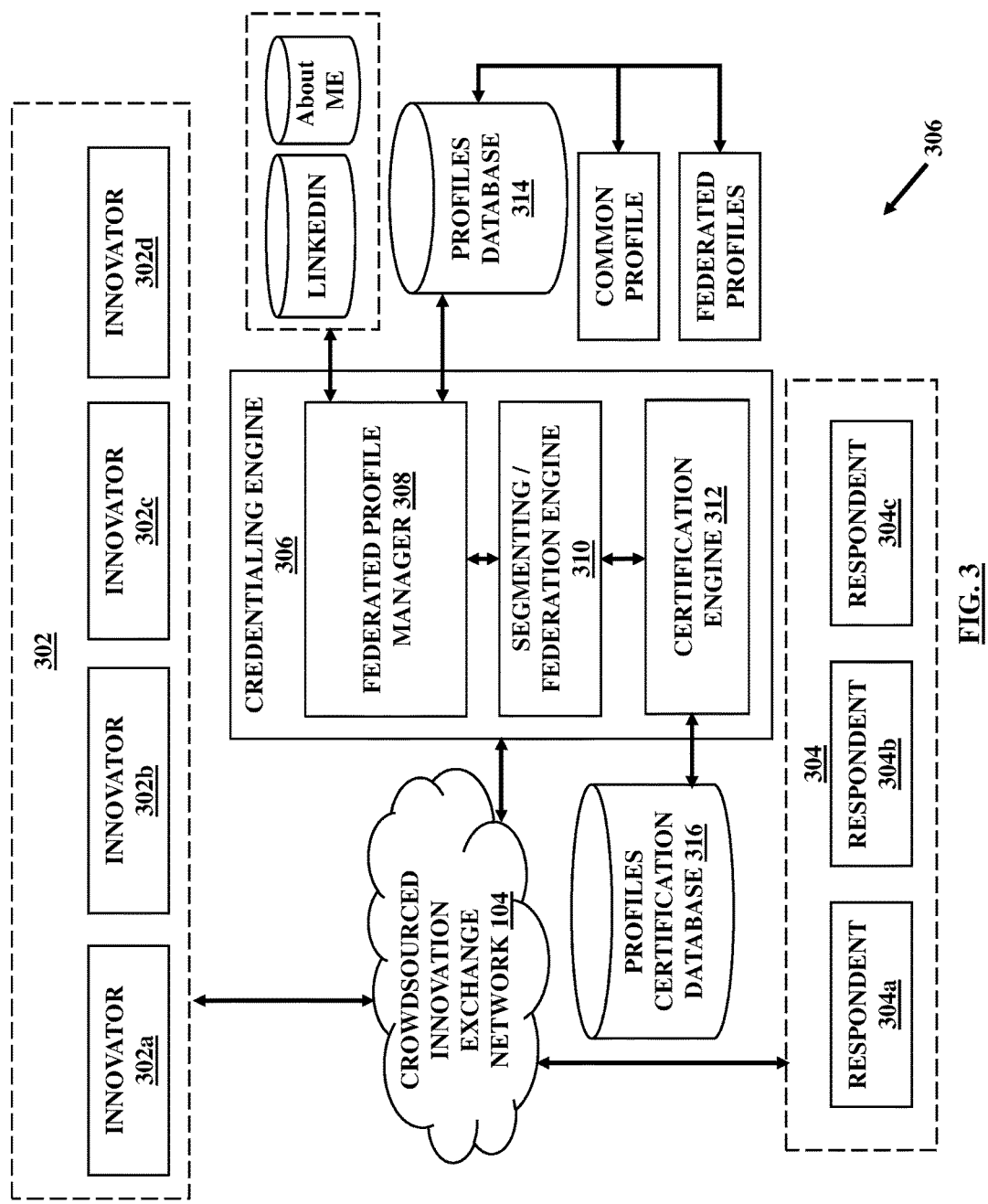
FIGS. 3 through 5 depict exemplary embodiments of a computerized credentialing system in accordance with various embodiments.
Figure 4:
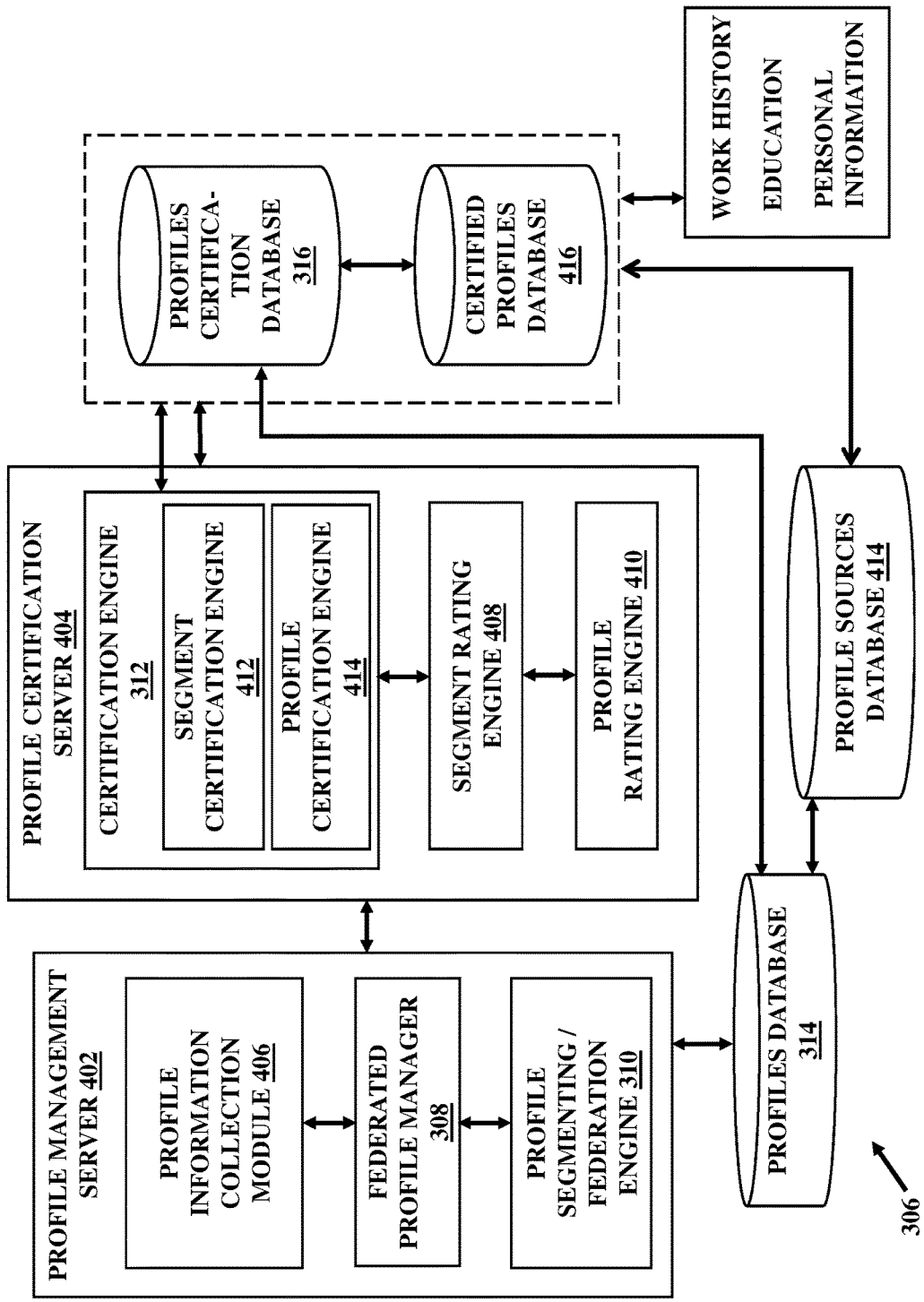
Figure 5:
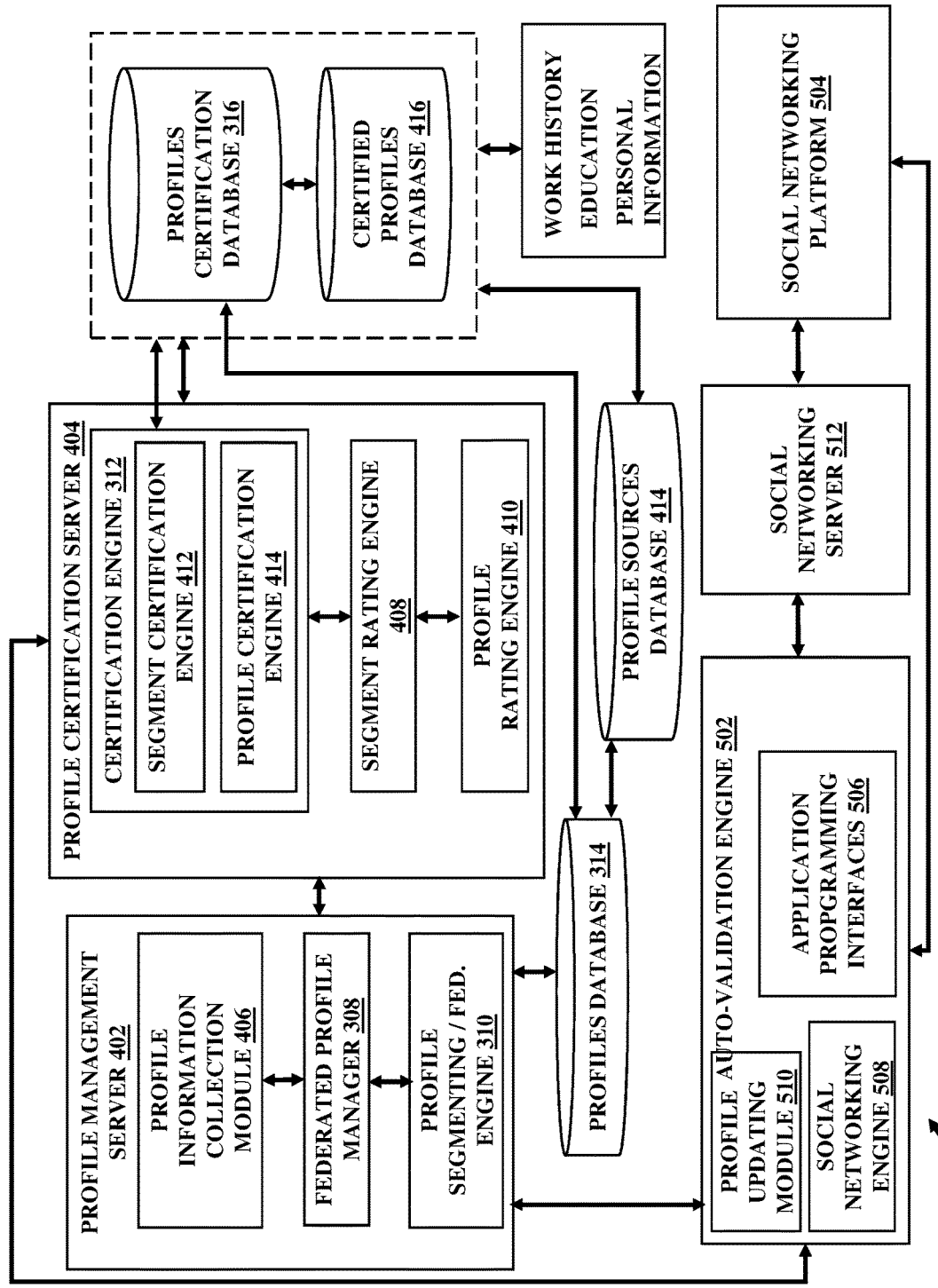

FIGS. 3 through 5, with reference to FIGS. 1 and 2, depict exemplary embodiments of a credentialing system or engine 306, among other things, for determining credentialed expertise of an innovator in accordance with various embodiments.

FIG. 3, with reference to FIGS. 1 and 2, illustrates generally, but not by the way of limitation, among other things, an exemplary operating environment for crowdsourced credentialing of the innovators. The environment includes a plurality of innovators 302a-302d (together referred to as 302) and a plurality of respondents 304a-304c (together referred to as 304) operatively connected in a crowdsourced innovation exchange network 104. The credentialing system or engine 306 is operatively connected to the network 104 and is accessible by the innovators 302 (and associated computing terminals) and the respondents 304 through the network 104 using, for example, a web-based interface or portal (not shown in FIG. 2).

The network 104 may employ a wireline or a wired communication channel or both. The wireless communications network may include, for example, but not limited to, a digital cellular network, such as Global System for Mobile Telecommunications (GSM) network, Personal Communication System (PCS) network, or any other wireless communications network. The wire line communications network may include, for example, but not limited to, a Public Switched Telephone Network (PSTN), proprietary local and long distance communications network, or any other wire line communications network. In addition, the crowdsourced innovation exchange network 104 may include, for example, digital data networks, such as one or more local area networks (LANS), one or more wide area networks (WANS), or both LANS and WANS to allow interaction with the credentialing engine 306. One or more networks may be included in the crowdsourced innovation exchange network 104 and may include both public networks such as the Internet, and private networks and may utilize any networking technology and protocol, such as Ethernet, Token Ring, Transmission Control Protocol/Internet Protocol (TCP/IP), or the like to allow interaction with the credentialing engine 306.

The innovators 302 may include one or more of a physician, doctor, surgeon, healthcare expert, any other healthcare professional, or any other professional or expert from other industry such as energy, financial, transportation, logistics, and numerous other industries. The respondents 304 may include one or more of a physician, doctor, surgeon, healthcare expert, any other healthcare professional or healthcare organization such as a hospital, or any other professional or expert from other industry such as energy, finance, transportation, logistics, and numerous other industries, or any other person who may be interested in credentialing or accreditation process of the innovators 302 or may be any person related to the innovators 302 and who may provide a trusted response or comment on information about the innovators 302 such as qualifications, work history and the like. A plurality of industry related or other agencies such as hospitals, nursing centers, research institutes, financial companies, financial agencies, transportation agencies, logistic companies, energy related agencies, and others or hiring agencies or placement agencies may also access the engine 306 to receive credentialing or verification services provided by the engine 306 for the plurality of innovators 302. In such embodiments, the engine 306 may provide the services to such agencies based on credentialing of the information of the innovators 302 obtained by the respondents 304.

The innovators 302, and respondents 304 may be operatively connected to, for example, any type of electronic data processing system or communication device or a client device operatively connected to the communications network. Examples of such an electronic data processing system or client device may include personal computer systems, such as desktop or laptop computers, workstation computer systems, server computer systems, networks of computer systems, personal digital assistants (PDAs), wireless communications devices, portable devices, or any other electronic data processing system. The client devices or data processing systems may include hardware/software computing devices capable of computational tasks associated with profile creation, modification, verification, and presentation and the like as described below. These tasks may be performed through stand alone application, via web browser GUI, or via a RII. An embodiment herein may be implemented as computer software incorporated as part of an online social networking system. The credentialing system 206 may operate with the client device using a Windows™, Macintosh™, UNIX™, Linux™ or other operating system equipped with a web browser application, or other web-enabled device capable of connecting to the crowdsourced innovation exchange network 104.

The credentialing engine 306 provides a technical capability and a federation model such that profiles of the innovators 302 may be created including details about the innovators 302 and stored in the engine 306. The details may include demographic information, personal information, educational background, work history or any other similar information. These profiles may be shared with the plurality of respondents 304, and innovators 302 based on set standards and preferences and rules to implement a federated exchange capability wherein distinct portions of the profiles may be credentialed or accredited or verified and shared or exchanged with the innovators 302, respondents or 304 in a federated manner. The engine 306 further provides a credentialing and verification and accreditation capability such that profiles of each of the innovators 302 may be credentialed or verified or accredited by any other expert or the respondents 304 for the use of the credentialed profiles by other innovators 302 or an agency or organization such that the entire credentialed information or profiles available and credentialed through federated sources is accessible at a single location from the engine 306. In some embodiments, the engine 306 further provides a capability to create a federated model of the profiles such that the federated segments or portions or profiles, as described below in detail, may be verified or credentialed distinctly by distinct federated respondents 304 in the crowdsourced innovation exchange network 104 such that the crowdsourcing increases the level of trust and authenticity and reliability of the credentialing and credentialed information due to cumulative effect of several federated verifications by the crowdsourced respondents 304 for the same segments of the profiles.

The credentialing engine 306 as shown in the drawings includes a federated profile manager 308, a segmenting or federation engine 310, and a certification engine 312 discussed below in detail.

The federated profile manager 308 is configured to receive information for profile creation from the plurality of innovators 302. The federated profile manager 308 is responsible for maintaining the information received from the innovators 302 and modify it as per updates from the innovators 302. The federated profile manager 308 is configured to be linked to several sources of information that have the experts' presence such as, for example, their social networks including social networking websites, their educational institutions, work environments and the like. The federated profile manager 308 collects information from a plurality of sources for each of the innovators 302 and collates the records and information in the form of a single common profile of each of the innovators 302 that are associated with and communicate with the engine 306. The profile manager 308, for example may collect information from federated sources such as Linkedin™, Myspace™, About.Me™, education institutions, workstations, and the like. The common profile maintained by the engine 306 may be viewable by the innovators 302, respondents 304, relevant organizations, or any other persons or entities associated with or subscribed to the engine 306. In some embodiments, the federated profile manager 308 may automatically retrieve the profile information from the social networks. In other embodiments, the federated profile manager 308 may maintain information that is submitted by the innovators 302 voluntarily.

The federated profile manager 308 may allow the innovators 302 to maintain their profiles digitally in the engine 306 and protect the information in their profiles and their attention from inappropriate access, and makes their personal profiles connectable. The credentialing engine 306 may further enable the profiles and information therein as searchable by the innovators 302 and the respondents 304. In doing so, the innovators 302 may use a web-based interface to access the user interface or portal of the engine 306. The innovators 302 may then create their profiles and update profile information using the user interface after an initial registration process. To register, the innovators 302 may complete a registration page and enter a valid email address as a unique identifier, and a private password. The innovators 302 may then set up their digital profiles and enter the information. The profile describes the user's background, experience, current and prior interests, capabilities, positions and titles, skills, values, projects, goals, employing organizations, working stations, etc. The innovators 302 may add contacts by entering contact and relationship information, and profile information for the contact, or a link to the contact's own profile on the engine 306. The contact information may also be automatically uploaded or extracted from other sources such as an electronic address book, and authorized by the innovators 302 for use in the credentialing engine 306. The innovators 302 may not want their address book integrated in the engine 306. In this case, the experts' address book would be uploaded, but not integrated into the credentialing engine 306 and possibly hidden from others. The profiles and contact information may be stored in either a central database or in distributed databases. For example, the engine 306 may include or be coupled to a profiles database 314 that may store the information pertinent to the profiles of the innovators 302.

In some embodiments, once an innovator (also referred as expert) 302a joins the network 104 and subscribes with the credentialing engine 306, the information included in the profiles is ready for credentialing, verification, accreditation, or any other such purpose. The entire profiles may thus be credentialed or verified by the engine 306 from the plurality of crowdsourced respondents 304 such that the crowdsourced respondents 304 may verify the profiles and credential them. The credentialing may also determine the profiles as accurate or inaccurate, trustable or non-trustable, authentic or unauthentic, fraud or genuine, etc.

In other embodiments, once the plurality of innovators 302 joins the network 104, the profiles are segmented into distinct portions or segments referred to as federated profiles by the segmenting or federation engine 310. The segmenting or federation engine 310 is configured to receive the common profiles from the profile manager 308 and segment them into the federated portions or segments or profiles. In an example, the segmenting or federation engine 310 fragments a common profile of an expert into a plurality of federated profiles based on commonalities in content of the federated profiles. The federated profiles are treated as distinct profiles for the purpose of credentialing separately by the crowdsourced respondents 304. For example, a common profile P of the professional 302a may include the following details:
Name: Amir A.
Age: 38 years
Sex: Male
Location: Texas, US
Education: B.S in Computer Science from Purdue University (1995)
M.S. in Computer Science from Purdue University (1997)
M.B.A. in Strategic Management (2005) from Kellogg School of Management
PhD, Competitive Strategies (2011) from Kellogg School of Management
Certifications and Awards:
   Certification by Microsoft
   Certification of Proficiency in Networking Technologies
   Best Student award in 1994 by Purdue University
Work Experience:
   ABC: 1997-2003
   SDF: 2003-2005
   XCV: 2011-now For the purpose of simplicity of description, only some specific details are included as an example in the above profile, however several other details may also be included without limitations. The segmenting engine 310 may be configured to segment the profile into distinct federated profiles. In an example, the taxonomy of the profiles may be "official" and centrally managed or may be extended by any of the federation partners.

In some embodiments, the above common profile may be segmented by the segmenting or federation engine 310 into several federated profiles as given below:
Segment 1: First Name—Amir
Segment 2: Last Name—A.
Segment 3: Middle Name—Null
Segment 4: Sex—Male
Segment 5: Location (Area)—Texas
Segment 6: Location (Country)—US
Segment 7: Education—B.S.
Segment 8: B.S. in year—1995
Segment 9: Education—M.S.
Segment 10: M.S. in year—1997
Segment 11: B.S. from University/Institute—Purdue University
Segment 12: M.S. from University/Institute—Purdue University
Segment 13: Education—M.B.A
Segment 14: MBA from university/institute—Kellogg School of Management
Segment 15: MBA in year—2005
Segment 16: MBA specialization—Strategic Management
Segment 17: Education—PhD
Segment 18: PhD from University/Institute—Kellogg School of Management
Segment 19: PhD in year—2011
Segment 20: PhD work—Competitive Strategies
Segment 21: Certification—by Microsoft
Segment 22: Certification of proficiency
Segment 23: Certificate of Proficiency in stream—Networking Technologies
Segment 24: Award: Best Student
Segment 25: Award of Best Student received in year—1994
Segment 26: Awarded by—Purdue University
Segment 27: Work Experience—ABC
Segment 28: ABC tenure begins in—1997
Segment 29: ABC tenure ends in—2003
Segment 30: Work Experience—SDF
Segment 31: SDF tenure begins in—2003
Segment 32: SDF tenure ends in—2005
Segment 33: Work Experience—XCV
Segment 34: XCV tenure begins in—2011
Segment 35: XCV tenure ends in—continuing now As described above, a single common profile is segmented by the segmenting or federation engine 310 in thirty-five discrete federated profiles that are distinct in one or more ways. In accordance with various embodiments, the segmenting or federation engine 310 may be configured to segment a common profile in as many discrete federated profiles as possible. Therefore, the entire information contained in a common profile is segmented into several discrete federated profiles. For example, the above-described common profile is converted into thirty-five such federated profiles. Upon segmenting, the federated profiles may be communicated to the federated profile manager 308. Thus, the federated profile manager 308 stores common profiles as well as federated profiles associated with the professionals or innovators 302 in the profiles database 314.

The segmenting or federation engine 310 may include hardware and software components configured to perform computational tasks associated with segmenting of the common profiles into the federated profiles. Once segmented by the segmenting or federation engine 310, the federated profile manager 308 may further classify the federated profiles or segments into groups of federated profiles for the same innovators 302 so that the groups may include similar federated profiles based on certain parameters. For example, the work experience related federated profiles 27, 30, and 33 may define different companies where an expert was employed and is employed may be grouped together do define another type of profile referred to herein as a sub-profile. Similarly, various other groups may be formed to create various other sub-profiles based on several possible combinations of the federated profiles or segments or profile portions. The credentialing engine 306 thus may facilitate maintaining the common profiles, sub-profiles, and the federated profiles for the same experts thus providing a three-level profile management facility. As used herein, the terms portion, segment, and federated profile are used interchangeably without limitations.

The credentialing engine 306 further includes the certification engine 312 coupled to the segmentation or federation engine 310 and the federated profile manager 308. The certification engine 312 is configured to allow the plurality of crowdsourced respondents 304 to respond to the segmented and classified profiles associated with the plurality of innovators 302 and credential them. The credentialing of each of the segmented portions or federated profiles associated with an expert 302a of the plurality of innovators 302 contributes to credentialing of the entire profile of the expert 302a upon collation of the credentialed portions. For example, the exemplary profile as discussed above includes thirty-five segments. The credentialing of each of the segments influences overall credentialing of the entire common profile. Therefore, if all the thirty-five segments are credentialed and verified as correct by one or more respondents 304, a trust may be associated about the profile information and the information may be considered as true or authentic. As more and more persons or respondents from the plurality of crowdsourced respondents 304 verify the information in the federated profiles, the trust associated with the respective segments increases. Further, the crowdsourcing index may be associated to indicate and factor in the level of crowdsourcing. In an example, the crowdsourcing index may bear a non-linear relationship, such as an exponential relationship, with the number of respondents 304 crowdsourcing an expert 302. Therefore, the degree of reliability and trust may increase non-linearly as more and more respondents credential an expert. Therefore, the crowdsourcing may facilitate in credentialing more accurately and with a higher reliability of the federated profiles than that credentialed from only a few sources. Further, the overall accuracy of the common profile may be determined based on a cumulative effect of accuracy of each of the federated profiles. For example, if the first ten of the segments from the above common profile are verified and the remaining twenty-five segments are not verified due to no response from the respondents 304, this may not yield an overall high accuracy of the common profile and may still require credentialing and verification of the remaining segments but may be considered as acceptable to a certain extent. On the contrary, if the remaining twenty-five segments are rejected and verified as incorrect information by the respondents 304, the overall common profile may be considered as inaccurate. Further, since the discrete federated profiles associated with an expert 302a are credentialed from the plurality of crowdsourced respondents 304, there may be a high level of accuracy in the credentialing and the credentialing may be considered as highly authentic and reliable.

The certification engine 312 is adapted to certify the stored federated profiles relating to the innovators 302 such as physicians or other industry experts who must have their credentials verified for use by various agencies or for use, for example, by the innovators 302 themselves during filling and submission of forms to various companies for matters such as hiring purposes or other purposes or document review processes. The credentialing information related to a particular expert 302a desiring to use the embodiments herein is initially input in the form of a common profile and then segmented and credentialed separately for each of the federated profiles through the crowdsourced network of the plurality of respondents 304. Therefore, the credentialing information, when credentialed for each of the federated profiles, is more accurate and valid and acceptable than the common profile verified in its entirety where special attention may not be paid to every record of the common profile. Secondly, the degree of acceptance of credentialing information is much higher through crowdsourcing than for a single verification by a single source. Therefore, according to an embodiment herein, the number of sources credentialing a particular federated profile may be associated with each of the segments to indicate a level of accuracy of the credentialing information. For example, if a federated profile is credentialed and verified by eighteen sources in the network, it may be considered as highly acceptable. Also, the relevant information about credentialing such as who credentialed, when credentialed, etc. may also be associated with each credentialing of each of the segments so that an authenticity may be judged by associating an overall impact of the federated profiles' credentialing, the number of times credentialed, and the trust factor about the source who verified and relevance about the time when verified. Therefore, in such embodiments, a multi-scaled and cumulative score may be determined and multi-scaled and cumulative credentialing may be performed based on the multi-scaled cumulative score determined. Further, since a single federated profile may be verified by the plurality of crowdsourced respondents 304, the credentialing engine 306 may determine the extent of inconsistency between several credentialing occurrences by several different respondents 304 for the same federated profile. In this manner, the engine 306 may be configured to determine an index of inconsistency depending on the distribution of differences across several credentialing occurrences by the several respondents 304. The credentialing engine 306 may be configured to generate a digital map indicating the extent and coverage of inconsistencies among the several responses and credentialing for the same federated profiles. The map together with the inconsistency index may facilitate in determination of a level of trust in the overall credentialing of the same federated profile. This process may be repeated for each of the federated profiles for a common profile of an expert such as expert 302a and thus may determine an overall index of inconsistency and overall distribution map and overall trust factor for the common profile.

In some embodiments, various organizations or agencies such as, for example, document reviewing and inventions or ideas evaluation agencies may use the credentialing information, index of inconsistency, and distribution map as obtained from the engine 306. The credentialing information may include information such as who verified or credentialed, when verified, how many times verified, how many different and unique verifications, trust factor associated with each verification based on such as a respondent's relationship with an expert such as 302a or any other factor, and other similar information. In some embodiments, the credentialing information may be used by the innovators 302 themselves so that they may use the credentialing information as a proof of expertise and submit it along with various application forms to companies, hiring agencies, firms, healthcare centers, hospitals or any other agency or organization, financial institutions, energy related companies, logistic companies, transportation companies, and the like. Various types of information such as demographic, personal work history, educational information, affiliation with hospitals or institutes etc. may be credentialed. The credentialed information may include information such as person's name, address, practice specialties, appointment status, hospital associations, credentials (including educational background, internships, and residency programs), state licensing information, malpractice liability insurance information, and personal and professional references. This entire information may be stored in the profiles database 314 maintained by the federated profile manager 308.

In some embodiments, the certification engine 312 may be coupled to or may include a profiles certification database 316. The profiles certification database 316 may include the credentialing information as discussed above. In some embodiments, the profiles certification database 316 may be included within the profiles database 314 only, and thus a single database may include memory spaces for storing the profiles information and the certification or credentialing information.

In some embodiments, in creating the common profile and uploading profile information in the database, a separate application form may be completed for each professional participating in and using the benefits of the engine 306. The information in the application form may be preferably provided to the profiles database 314, which may store the experts' profile information using the engine 306. The information may be stored as a series of logically organized experts' profiles and may be extracted as necessary during segmentation by the segmenting or federation engine 310. In some embodiments, the process of segmenting may be initiated by the segmenting or federation engine 310 automatically as and when new information is added or updated. In case the past information is modified, the segmentation task is performed again to update the federated profiles and perform credentialing of the updated federated profiles once again. In such cases, only relevant credentialing may be needed to be revised depending on the updates instead of rejecting the entire past federated profiles and credentialing information associated with them.

FIG. 4, with reference to FIGS. 1 through 3, illustrates the credentialing engine 306 in accordance with an embodiment. As shown, the engine 306 may include a profile management server 402 and a profile certification server 404. The profile management server 402 includes a profile information collection module 406, the federated profile manager 308, and the profile segmenting or federation engine 310.

The profile information collection module 406 may be configured to generate information about the plurality of innovators 302. In some embodiments, the profile information collection module 406 may be disposed separately from the federated profile manager 308, while in other embodiments it may be included in or coupled to the federated profile manager 308. The profile information pertaining to profiles of the plurality of innovators 302 may be generated by distributing application forms through a graphical user interface accessible by the innovators 302 such that the innovators 302 may fill the forms and submit with the engine 306. The information may be transformed in the form of profiles by the federated profile manager 308. The segmenting or federation engine 310 may then use the profiles information and perform the task of segmenting of the common profiles into the federated profiles associated with each of the innovators 302.

The profile certification server 404 may be communicatively coupled to or included in the profile management server 402. The profile certification server 404 may include the certification engine 312, a segment rating engine 408, and a profile rating engine 410. The certification engine 312 may further include a segment certification engine 412 and a profile certification engine 414.

The segment certification engine 412 may be configured to facilitate credentialing or certification of the federated profiles associated with the common profiles associated with each of the innovators 302. The segment certification engine 412 is configured to allow the plurality of crowdsourced respondents 304 to respond to the federated profiles associated with the common profiles of the plurality of innovators 302 and credential them. The credentialing of each of the federated profiles associated with the common profiles of each of the innovators 302 contributes to credentialing of the entire common profile of the innovators 302 upon collation of the credentialed federated profiles. As more and more persons or respondents from the plurality of crowdsourced respondents 304 verify the information in the federated profiles, the trust associated with credentialing of the respective federated profiles increases. Therefore, the crowdsourcing may allow credentialing of the federated profiles to a higher degree of accuracy and reliability. Since the discrete federated profiles associated with an expert 302 are credentialed from the plurality of crowdsourced respondents 304, the credentialing defines a high level of accuracy and may be considered as highly authentic and reliable and acceptable by third parties or agencies. Moreover, the crowdsourcing index may be associated to factor in the effect of crowdsourced credentialing as discussed above.

The segment certification engine 412 is adapted to certify the stored federated profiles relating to the innovators 302 who must have their credentials verified. According to some embodiments herein, the number of sources credentialing a particular federated profile may be associated with each of the segments to indicate a level of accuracy of the credentialing information. Also, the relevant information about credentialing such as who credentialed, when credentialed may also be associated with each credentialing of each of the federated profiles so that an authenticity may be judged by associating an overall impact of the federated profiles' credentialing, number of times credentialed, and trust factor about the source who verified and relevance about the source and time when verified. Therefore, in such embodiments, a multi-scaled and cumulative score may be determined and multi-scaled and cumulative credentialing may be performed based on the multi-scaled cumulative score that is determined.

The information pertaining to credentialing of the individual federated profiles of a particular common profile associated with an expert such as expert 302a may influence an overall credentialing of the common profile. For example, individual credentialing of the federated segments may contribute to the overall common profile credentialing such that the credentialing of the overall common profile may depend on each of the federated profiles' credentialing with a weightage attached to each credentialing of the federated profiles. The collated contribution considering weightage effect of each credentialing finally decides credentialing of the overall common profile. The task of credentialing the overall common profile associated with an expert such as expert 302a may be performed by the profile certification engine 414. For example, the profile certification engine 414 may facilitate credentialing of the profile in its entirety based on the collated effect of credentialing of the federated profiles associated with the common profile of an expert such as expert 302a. The profile certification engine 414 may receive information pertinent to credentialing of each of the federated profiles associated with a common profile and then associate the defined weightages to each of the federated profiles and perform cumulative credentialing of the common profile. In an embodiment, the weightages may be determined based on parameters defined by a service provider who operates the engine 306. In such embodiments, the weightages may be defined based on, for example, past experiences or current understanding about the significance of accuracy of credentialing for different segments. For example, the accuracy of credentialing may be more important for work history than information pertinent to hobbies of a professional when applying for a job. Therefore, the objective use of the credentialing information may influence determination of the weightages and hence the overall credentialing. Therefore, a score indicative of the influence of the objective may be associated for the credentialing purposes in some embodiments. In some embodiments, the weightages may be defined by an agency requiring the credentialing information. Therefore, in such cases, the profile certification engine 414 may perform credentialing of the common profile in a custom, defined manner and also in association with the objective score.

The profile certification server 404 further includes the segment rating engine 408. The segment rating engine 408 is configured to associate a rating to each of the credentialed federated profiles based on credentialing from the crowdsourced plurality of respondents 304 and depending on a level of accuracy and trust associated with the credentialing of the federated profiles. The rating may depend on who credentialed a federated profile, when was a profile credentialed, how many times a profile was credentialed, how many unique credentials are performed, relevance of respondents 304 credentialing the federated profile, relationship of the respondents 304 with the expert such as 302a of the credentialed federated profile, and the like.

The profile certification server 404 may further include the profile rating engine 410. The profile rating engine 410 is configured to associate a rating to an entire profile based on credentialing of each of the federated profiles and ratings associated with each of the federated profiles as cumulatively determined by the segment rating engine 408.

The profile management server 402 is coupled to the profiles database 314 to store information pertinent to the profiles of the plurality of innovators 302. The profiles database 314 may be coupled to the federated profile manager 308 such that the federated profile manager 308 maintains the information stored in the profiles database 314.

The profile certification server 404 may be coupled to the profiles certification database 316. The profiles certification database 316 is configured to store information pertinent to credentialing such as certification status of the federated or common profiles associated with the plurality of innovators 302. For example, the certification status may include one or more of a verified segment, verified profile, pending verification, verification in progress, segment rejected as incorrect, profile rejected as incorrect, and the like. The profiles certification database 316 may be coupled to the profiles database 314 and the certification engine 312.

The profile certification server 404 may be coupled to the certified profiles database 416. The certified profiles database 416 may further be coupled to the profiles certification database 316. The certified profiles database 416 may be configured to store profiles that have been verified by the certification engine 312. An entity or any other agency may be allowed a direct access to the certified profiles database 416 based on preferences and rules defined for the entity or the agency. The entity may be one of a medical entity such as a hospital, nursing center, doctor, physician, healthcare unit, and government healthcare department, or a financial institute, or a logistic company, or a transportation company, or a company in the energy sector, or any other third party or agency. The certified profile or credential database 416 may further store information pertinent to one or more of work history, education, and personal demographics, affiliations to hospitals or other institutes etc of one or more innovators 302 corresponding to one or more of verified profiles.

The profiles database 314, profiles certification database 316, and the certified profiles database 416 may be coupled to a profiles sources database 414. The profile sources database 414 may include information about a plurality of sources in the crowdsourced innovation exchange network 104 that are linked to the federated profiles associated with the plurality of the innovators 302, and information about a plurality of sources who respond to the federated profiles for credentialing. For example, in the crowdsourced innovation exchange network 104, the plurality of respondents 304 may credential the federated profiles and thus the profiles sources database 414 may store their details, their names, other information, their relevance and relationship with the innovators 302 associated with the federated profiles they credential and time of credentialing, and the location of original credentialing or any other such information pertinent to the credentialing sources, etc.

FIG. 5, with reference to FIGS. 1 through 4, illustrates another embodiment of the credentialing engine 306. The credentialing engine 306 may include the profile management server 402 and the profile certification server 404 as discussed above. The engine 306 may further include an auto-validation engine 502 coupled to the profile certification server 404 and the profile management server 402. The auto-validation engine 502 is further communicatively linked to a social networking platform 504. The social networking platform 504 hosts information related to one or more of the experts. For example, the social networking platform 504 may host social profiles of the innovators 302 where the innovators 302 may store and update their personal, professional, or other such details or may communicate in a social network with friends, relatives, family members, or other such networking contacts.

The auto-validation engine 502 is configured to further certify the credentialing of the federated profiles that is performed by the certification engine 312. The second level certification by the auto-validation engine 504 is performed by using the information about the one or more innovators 302 from the social networking platform 504. For example, an expert such as expert 302a may be associated with a social networking website such as a Linkedin™ or Facebook™. The expert 302a may maintain a separate profile for each such social networking website. The credentialing of the expert 302a for specific federated profiles may thus be further verified by using the information obtained from the social networking profiles.

In an embodiment, the credentialing by the respondents 304 is used to associate a rating and define a level of trust for the federated profiles and the common profiles. The further verification based on the information obtained from the social profiles of the innovators 302 may further associate another rating or score to the federated profiles such that a level of trust about the plurality of innovators 302 and their federated and common profiles may be determined based on a cumulative effect of credentialing and the auto-validation of the federated profiles and the common profiles. The cumulative score determined based on individual scores from the auto-validation and the credentialing by the respondents 304 may define a net rating and overall credentialing of the federated profiles and the common profiles. The federated profiles and the common profiles in association with the information pertinent to the credentialing and the auto-validation may thus be used or accessed by agencies or organizations or entities to determine a level of trust in the credentialed information; i.e., the credentialed federated and, thus, common profiles.

The auto-validation engine 502 may include application programming interfaces (APIs) 506, a social networking engine 508, and a profile updating module 510. The social networking engine 508 is coupled to at least one social networking server 512. The social network engine 508, which may be controlled by the social network server 512, is configured to process a request of the credentialing engine 306 for retrieving social profiles information and verifying the credentialed federated and common profiles by using the information obtained from the social profiles. The social networking engine 508 is communicatively coupled to the social networking platform 504 through the social network server 512 to allow interfacing of the engine 306 with the social networking service or platform 504. The social network server 512 may provide a programmatic web interface via the network 104 for accessing the social profiles by the engine 306. In some embodiments, the social networking server 512 may store social data related to the one or more innovators 302 obtained from the social profiles hosted by the social networking platform 504 to integrate the social data with the credentialed federated profiles for further verification or updating of the credentialing by auto-validation.

The social networking engine 508 may utilize the APIs 506 to allow verification of the federated segments associated with the plurality of innovators 302 based on the information contained in the social profiles of each of the innovators 302 maintained by the social networking platform 504. In an embodiment, the social profiles maintained by the social networking platform 504 are distinct from the federated or common profiles of the professionals or innovators 302 maintained by the federated profile manager 308. The APIs 506 further allow the auto-validation to determine an extent of mapping between the information contained in the two distinct profiles maintained by the federated profile manager 308 and the social networking platform 504. The social networking platform 504 may include several social networking sources. The social networking sources may include, without limitations, social networking websites, educational institutions, employers' databases, etc. For example, an expert such as expert 302a may be associated with one or more of such or other similar social networking sources in the social networking platform 504. The APIs 506 are adapted to link each of the federated profiles to one or more such distinct sources of the social networking platform 404 such that a unique identifier is maintained that associates a distinct source of the social networking platform 504 to a federated profile.

The profile updating module 510 is configured to update or modify the profiles based on further verification of the federated profiles after auto-validation. For example, even after the credentialing by the respondents 304, the auto-validation may demand to modify the federated profiles which the profiles updating module 510 may do, in some cases after seeking permissions from the innovators 302. The profile updating module 510 may be communicatively coupled to the profile management server 402 so that the federated profile manager 308 may store and maintain the modified federated and common profiles.

The social networking platform 504 may include, for example, one or more social networking sources. The sources may include computer modules such as social networking websites, educational institutions, employers' databases or portals or platforms, hiring agencies' portals, and other such sources of creating a socially aware network. Some examples of social networking websites are, without limitations, Linkedin™, MySpace™, About Me™, etc.

A service provider may deploy the credentialing engine 306 and provide credentialing services to various organizations or agencies that may include a hiring agency, recruitment and selection or placement department or agency, document or inventions or ideas reviewing and scoring and evaluation agencies, an entity such as a hospital or a medical institute, financial institute, logistic company, transportation company, etc. The organizations such as document or inventions or ideas reviewing and scoring and evaluation organizations may deploy these systems in-house for evaluation of ideas or documents. An expert such as expert 302a may submit his/her profile details to the service provider that may be stored in the engine 306. The service provider may obtain verifications and credentialing of the profile details or other information provided by the expert 302a and may store the information pertinent to the credentialing of the information of the expert 302a. The service provider may utilize a crowdsourced innovation exchange network 104 of people including individuals such as the respondent/authorizer 304a who may be any other expert or any of the respondents 304. The service provider, expert 302a, and the respondent or authorizer 304a may connect with one another over the crowdsourced innovation exchange network 104 through a web-based graphical user interface that may serve as a portal for interconnection. The portal or interface may provide a subscription section through which the entities such as the expert 302a, agency, or the respondent/authorizer 304a may associate them with the credentialing engine 306. Different sections may be provided for each to the expert 302a, respondent 304a, and agency. Upon subscription, the expert 302a may be permitted to submit his/her details to the engine 306 and/or create a profile.

The profile information may be publicly visible in some embodiments or may be made visible to the specific respondent 304a by the service provider for credentialing purposes and receiving responses from the respondent 304a about the expert 302a. The profile information may be credentialed and verified in its entirety or in segments as discussed above and may be stored in the engine 306. The agency may thus know the accreditation or credentialing about the expert 302a by visiting the portal through a separate section defined for such agencies. Therefore, through the web-based portal or interface, the agency may be facilitated to collect credentialing information and the authenticity about the expert's profiles and other information by visiting the single centralized engine 306 and may not need to verify the details of the profiles from several sources such as workplaces, educational institutes, etc. Further, since the engine 306 performs credentialing from a crowdsourced network of innovators 302, the accuracy of the credentialing and authenticity and reliability of the profiles' information may be higher and the agency may rely on the information with a greater degree of trust and reliability. Further, since the profile information is segmented into the federated profiles, the credentialing may be more specific to each of the information details contained in the federated profiles and the agency may easily know which information is verified and which is not or which may be pending for verification. In some embodiments, the agency may also know who verified a particular federated profile, when was a particular federated profile verified, and how many unique verifications are performed for a specific federated profile. Therefore, with all these features provided through the engine 306, the credentialing may be made easier, quicker, trustable, reliable, accurate, and manageable.

Referring back to FIG. 2, with reference to FIGS. 1 and 3 through 5, the reputation of an expert may be indicative of a trust of a relevant community on the expert (or innovator referred interchangeably) 302a. The scoring device 204 may include or be coupled to a reputation assessment engine 206 that determines the reputation of the innovators 302 that indicate the trust of relevant communities on the innovators 302. In an example, the reputation may be assessed based on the experts' interaction with others on expert networking sites, information exchange platforms, and other knowledge interaction platforms. For example, an expert 302*a* may interact with a community including other experts in a relevant field; for example, medical equipment design through a knowledge platform. The interaction may be of the type of posting questions relevant to the field of medical equipment design, submitting answers to such questions posted by others, and reviewing answers posted by others in response to such questions. Any such interaction may lead to building or losing of the reputation of an expert 302*a* who interacts with the community. The ways of building or losing the reputation, together referred to as reputation assessment, may be defined by the reputation assessment engine 206. The reputation assessment engine 206 may, for example, evaluate and assess the reputation of an expert 302*a* based on the quality of the questions posted by him, the quality of the answers posted by him in response to questions posted by others, or the quality of review performed by the expert 302*a* for answers submitted by others. The reputation in such cases may be assessed by calculating the number of positive votes from others in the community, number of negative votes in the community, or neutral votes in the community to any kind of interactions by the expert 202*a*. In an embodiment, any positive vote (for example, a like comment or remark or vote) for a question posted by the expert 302*a* may earn him/her ten points of reputation, and any negative vote (such as any dislike remark, comment or vote) may cause the expert to lose ten points from the reputation. In an embodiment, any positive vote on an answer posted by the expert may earn him/her twenty points and any negative vote on such an answer may cause him/her to lose twenty points. In an embodiment, any positive vote on a review of an answer by the expert may earn him/her twenty-five points and any negative vote by others in the community on such a review may cause him/her to lose twenty-five points. In other embodiments, various other ways of assessment of the reputation may be defined without limitations. In an example, the reputation of an expert 302*a* may be tied to a relevant field or a relevant community by the reputation assessment engine 206. For example, the reputation assessment engine 206 may allocate a reputation of fifty in the area or community of medical equipment design but the same expert 302*a* may be allocated a reputation of minus twenty in the field or community of medical device programming. The reputation may be defined as positive value points as well as negative value points, whereby the positive points defining a degree of increasing trust by the community, and the negative points defining a decreasing trust by the community.

In an example, the extent of trust may be identified through voting. For example, votes may be posted in integral or fractional numbers such as +3, +3.5, −2, −4.2, and the like. In this way, a net summation of all the votings weighted with reputation assessment parameters (such as mentioned above) that define how much reputation points are earned or lost with each interaction, may result in the reputation of an expert 302*a* for a particular field or community.

Once the reputation assessment engine 206 evaluates the reputation of an expert 302*a* for a particular field or community (which is same as or similar to the field of the document under review), the document scoring device 204 may use the reputation of the expert 302*a* for determining the score of the document by using the reputation as an expert attribute. In such cases, innovators 302 and reputations of innovators 302 that are from the same or similar fields or communities as that of the documents under review are considered only so as to establish trust and authority of the innovators 302 by the relevant communities and use it as an indicator for validity and authenticity of documents review and scoring after aggregation of reputations from various such innovators 302.

In some embodiments, the reputation assessment engine 206 may also be configured for aggregating various discrete reputations from individual crowdsourced innovators 302 so as to determine an aggregate reputation for a group of crowdsourced innovators 302 used in evaluation, reviewing, and scoring of a document. The aggregate score may be a net equivalent score that may be associated with the crowdsourced innovators 302 to indicate the reputation of the entire crowdsourced community of the innovators 302 contributing toward document review and scoring.

The officiality is indicative of a position or a designation of an expert 302*a* in a relevant job. The scoring device 204 may include or be coupled to an officiality engine 208 that determines officiality of the innovators 302. In an example, different hierarchical positions as an indicator of officiality may be associated with specific ratings that may be used to associate an officiality score to an expert 302*a*. The officiality engine 208 may determine such officiality scores for individual crowdsourced innovators 302. In some embodiments, the officiality engine 208 may also be configured for determining an aggregate officiality score for a crowdsourced community of the innovators 302 that contribute to review and scoring of the document. The aggregate score may be a net equivalent score that may be associated with the crowdsourced innovators 302 as a group to indicate the officiality of the entire crowdsourced community of innovators 302 contributing toward document review and scoring. In the context of the embodiments herein, officiality refers to a qualitative and/or quantitative evaluation assessment of the crowdsourced community of innovators 302. This legitimizes the score provided by the innovators 302.

The evaluation device 202 may be coupled to a novelty evaluation device 210. The novelty evaluation device 210 provides a result quantifying one component of patentability. The novelty assessment or evaluation may be performed by posting defined questions to a crowd set in the crowdsourced network and receiving responses from them. In such cases, the crowd includes credentialed experts who may be considered only when they bear a threshold score of officiality, reputations, and the credentialed expertise as described above. The questions may be defined and rank ordered according to their perceived importance for the initiative or sub-innovation under evaluation. Based on the rank, questions may be scored in a weighted manner. For example, the patentability question of rank order one may contribute more to the patentability score than the patentability question of rank order five. The assessment and evaluation is configured to yield a minimum threshold score to qualify an innovation or a sub-innovation or any other initiative as novel. In some embodiments, the novelty assessment may be performed by the novelty evaluation device 210 by utilizing machine learning and automated search capabilities that result in identification of prior art relevant to various initiatives under consideration including the tracked sub-innovations.

The evaluation device 202 may be coupled to an obviousness decision module 212 that may be used to assess uniqueness of an initiative such as an innovation or a sub-innovation regarding its non-obviousness with reference to corresponding parent innovation of a sub-innovation. The obviousness decision module provides a result quantifying another component of patentability; i.e., non-obviousness. The obviousness decision or evaluation may be performed by posting defined questions to a crowd set in the crowdsourced network and receiving responses from them. In such cases, the crowd includes credentialed experts who may be considered only when they bear a threshold score of officiality, reputations and the credentialed expertise as described above. The questions may be defined and rank ordered according to their perceived importance for the initiative or sub-innovation under evaluation. Based on the rank, questions may be scored in a weighted fashion. For example, a question of rank order one may contribute more to the non-obviousness score than the non-obviousness question of rank order five. The assessment and evaluation is configured to yield a minimum threshold score to qualify an innovation or a sub-innovation or any other initiative as non-obvious. In some embodiments, the non-obviousness assessment may be performed by the obviousness decision module 212 by utilizing machine learning and automated search capabilities that result in identification of prior art relevant to various initiatives under consideration including the tracked sub-innovations.

The evaluation device 202 may be coupled to a revenue assessment engine 214 that may be used to assess potential revenue that may be aggregated from implementation of an initiative. The revenue assessment may be performed by posting defined questions to a crowd set in the crowdsourced network and receiving responses from them. In such cases, the crowd includes credentialed experts who may be considered only when they bear a threshold score of officiality, reputations, and the credentialed expertise as described above. The questions may be defined and rank ordered according to their perceived importance for the initiative or sub-innovation under evaluation. Based on the rank, questions may be scored in a weighted manner. The assessment and evaluation is designed to yield a minimum threshold score to qualify an innovation or a sub-innovation or any other initiative as potential enough to generate desired revenues. The revenue assessment may include projecting revenues to be generated from licensing the initiative such as a sub-innovation and projecting revenue to be generated from enforcing intellectual property contained within the initiative. The revenue assessment engine 214 may include or be coupled to a market assessment engine 216. The market assessment engine 216 may determine market potential. An output from the market assessment engine 216 may be used by the revenue assessment engine 214 such that the revenue assessment engine 214 may determine the revenue based on market potential and various other inputs. The market assessment engine 216 evaluates a market for defined market parameters related to the initiative under consideration so as to determine a value of an initiative for a target market.

The market assessment may be performed by posting defined questions to a crowd set in the crowdsourced innovation exchange network 104 and receiving responses from them. In such cases, the crowd includes credentialed experts who may be considered only when they bear a threshold score of officiality, reputations, and the credentialed expertise as described above. The questions may be defined and rank ordered according to their perceived importance for the initiative or sub-innovation under evaluation. Based on the rank, questions may be scored in a weighted manner.

The evaluation device 202 may be coupled to a significance determination engine 218 that determines the significance of an initiative for a target venture, or third party interested in borrowing the initiative from the innovator. For example, the initiatives may be submitted to an agency for the purpose of grants and financial aid. In such cases, the significance determination engine 218 may evaluate the initiative such as a sub-innovation in light of the requirements of the target agency and accordingly define a monetary value of the grant or financial aid. The significance determination may be performed by posting defined questions to a crowd set in the crowdsourced network and receiving responses from them. In such cases, the crowd includes credentialed experts who may be considered only when they bear a threshold score of officiality, reputations, and the credentialed expertise described above. The questions may be defined and rank ordered according to their perceived importance for the initiative or sub-innovation under evaluation. Based on the rank, questions may be scored in a weighted manner.

The evaluation device 202 uses the various inputs as determined from various engines and modules discussed above to evaluate an initiative. The evaluation process yields an evaluation output which may be used as an input by the scoring device 204.

The scoring device or the initiatives scoring device 204 associates an aggregate score to the initiative based on the evaluation by the evaluation device 202 on one or more inputs as discussed above.

In accordance with some embodiments as discussed above, the aggregate score of an initiative (ASI) for one or more inputs may be determined based on an empirical relation. An exemplary empirical relation may be as follows:

$$ASI = EW1 + RW2 + OW3 + BW4 + NW5 + VW6 + SW7 + MW8$$

Above, 'E' represents credentialed expertise, 'R' represents reputation, 'O' represents officiality, 'B' represents non-obviousness input, 'N' represents novelty input, 'V' represents revenue input, 'S' represents significance input, 'M' represents market input and W1, W2, W3, W4, W5, W6, W7, and W8 represent weightages of the respective inputs. In other embodiments, other similar empirical or non-empirical relationships with modifications may be considered without limitations.

In accordance with some embodiments as discussed above, the credentialing engine may evaluate the credentialed expertise (E) for the expert based on an empirical relation. In an example, the empirical relation may be as follows:

$$E = (PF11 + PF12 + \ldots + PF1N) \times (PF21 + PF22 + \ldots PF2N) \times \ldots \times (PFZ1 + PFZ2 + \ldots + PFZN)$$

Above,
PF11 represents credentialed federated profile score for a first federated profile of a first expert by a first respondent,
PF12 represents credentialed federated profile score for the first federated profile of the first expert by a second respondent,
PF1N represents credentialed federated profile score for the first federated profile of the first expert by an Nth respondent,
PF21 represents credentialed federated profile score for a second federated profile of the first expert by the first respondent,
PF22 represents credentialed federated profile score for the second federated profile of the first expert by the second respondent,
PF2N represents credentialed federated profile score for the second federated profile of the first expert by the Nth respondent,
PFZ1 represents credentialed federated profile score for a Zth federated profile of the first expert by the first respondent, PFZ2 represents credentialed federated profile score for the Zth federated profile of the first expert by the second respondent, and PFZN represents credentialed federated profile score for the Zth federated profile of the first expert by the Nth respondent.

In an example, the empirical relation above considers profiles scores for entire federated profiles from 1 to Z. In an example, the empirical relation above considers all respondents from 1 to N. In accordance with other embodiments, other similar empirical or non-empirical relationships with modifications may be considered without limitations.

In accordance with some embodiments as discussed above, the scoring device 204 evaluates aggregate crowdsourced document score (ACDS) based on credentialed expertise and other attributes of the crowdsourced experts, based on an empirical relation. An exemplary relation may be as follows:

$$ACDS=\{(E1+E2+E3+\ldots+EX)W1+(R1+R2+R3+\ldots+RX)W2+(O1+O2+O3+\ldots+OX)W3\}(D1+D2+D3+\ldots+DX)CI$$

E1, E2, E3, . . . EX represent respective credentialed expertise of X number of crowdsourced experts,
R1, R2, R3, . . . RX represent respective reputation of the X number of crowdsourced experts,
O1, O2, O3, . . . OX represent respective officiality of the X number of crowdsourced experts,
D1, D2, D3 . . . DX represent respective document scores earned by the X number of crowdsourced experts, and
CI represents Non-Linear Crowdsourcing Index.

In other embodiments, other similar empirical or non-empirical relationships with modifications may be considered without limitations.

In some embodiments, the CI is defined non-linearly with integral ranges (R) of experts who credential the document. In an example, the first five of the ranges may be as follows, without limitations:
CI=1, when R=0-2 experts,
CI=1.2, when R=3-4 experts,
CI=1.5, when R=5-6 experts
CI=1.9, when R=7-8 experts, and
CI=2.5, when R=9-10 experts.

In an example, the CI may be calculated based on an empirical relationship that dynamically determines value of the CI with every integral change in number of expert credentialing the document.

The embodiments herein may employ other empirical and non-empirical tools for evaluation of the various inputs and scoring of the initiatives that are innovations and their respective sub-innovations.

Figure 6:
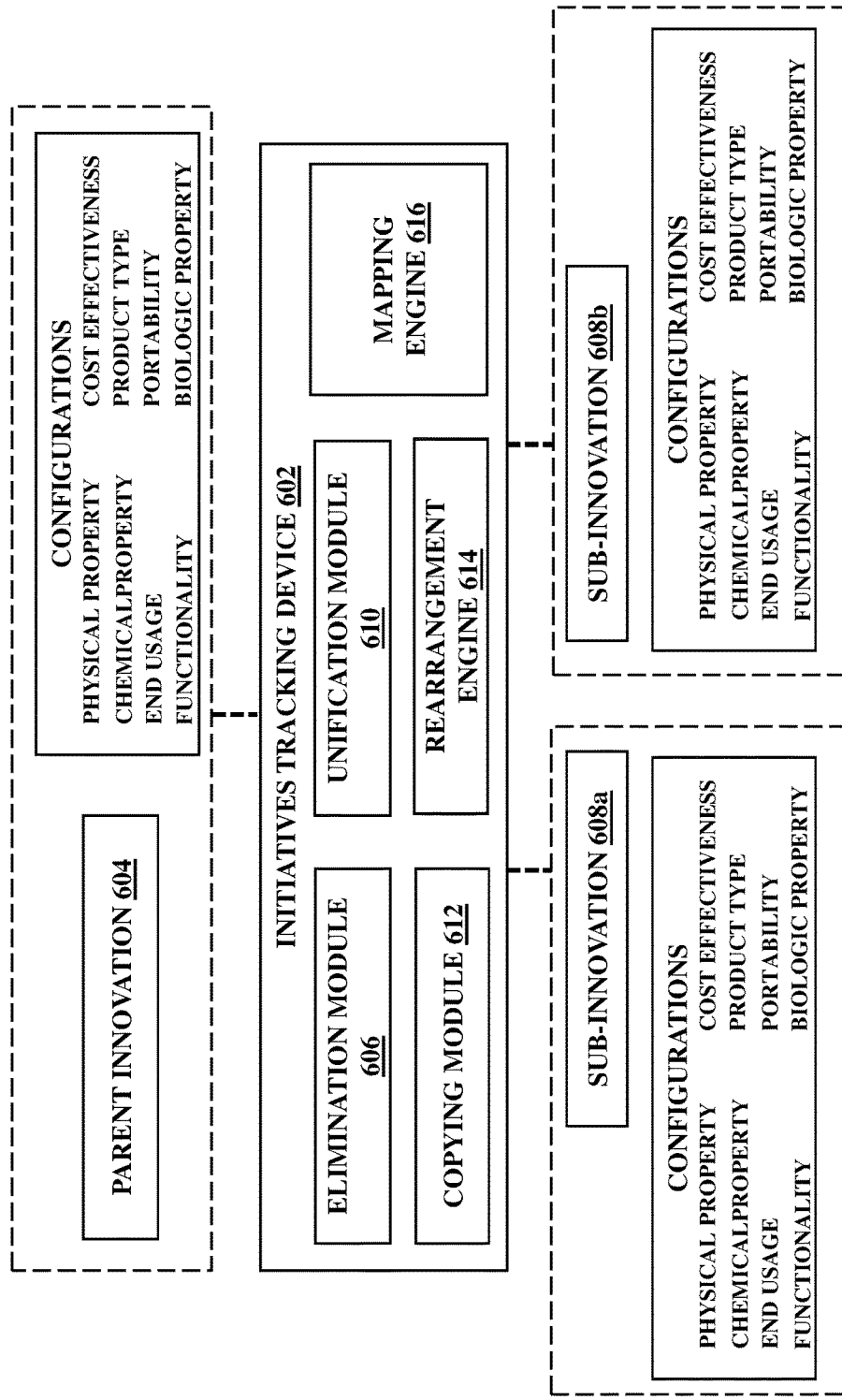
FIG. 6 illustrates an exemplary computerized initiatives tracking device in accordance with an embodiment herein.

FIG. 6, with reference to FIGS. 1 through 5, illustrates an exemplary initiatives tracking device 602 for developing or tracking sub-innovations by each of the innovations in the crowdsourced initiatives exchange network 104. In an example, the initiatives are developed or tracked by performing a set of automated tasks aiming to change configurations of a parent innovation 604 in at least one of the attributes or elements such that the resulting sub-innovation is different from the parent innovation 604 in at least one of the categories including physical property, chemical property, biological property, end usage, functionality, portability, cost effectiveness, and product type and bear a similarity relationship thread with the parent invention 604.

In an embodiment, the initiatives tracking device 602 includes an elimination module 606. The elimination module 606 tracks sub-innovations for the innovation 604 by removing seemingly essential elements or attributes from the parent innovation 604 such that the sub-innovations 608a and 608b have at least one element reduced from the innovation 604 and results in a tangible product that is different from the parent innovation 604 in at least one of the categories including physical property, chemical property, biological property, end usage, functionality, portability, cost effectiveness, and product type.

In an embodiment, the initiatives tracking device 602 includes a unification module 610. The unification module 610 tracks sub-innovations 608a and 608b for the innovation 604 by adding seemingly dissimilar and unrelated attributes or elements with the parent innovation 604 such that the sub-innovations 608a and 608b have at least one element or attribute added to the parent innovation 604 and results in a tangible product that is different from the parent innovation 604 in at least one of the categories including physical property, chemical property, biological property, end usage, functionality, portability, cost effectiveness, and product type.

In an embodiment, the initiatives tracking device 602 includes a copying module 612. The copying module 612 tracks sub-innovations 608a and 608b for the parent innovation 604 by copying attributes or elements of the parent innovation 604 and making alterations resulting in sub-innovations 608a and 608b becoming different from the parent innovation 604 in at least one of the categories including physical property, chemical property, biological property, end usage, functionality, portability, cost effectiveness, and product type.

In an embodiment, the initiatives tracking device 604 includes a rearrangement engine 614. The rearrangement engine 614 tracks sub-innovations 608a and 608b for an innovation by rearranging attributes or elements of the parent innovation 604 in a substantially different manner to result in the sub-innovations 608a and 608b that are different from the parent innovation 604 in at least one of the categories including physical property, chemical property, biological property, end usage, functionality, portability, cost effectiveness, and product type, wherein the rearrangement may be of a physical or a chemical type such that the physical rearrangement results in a different physical product and a chemical rearrangement results in a different molecule or compound.

In an example, the initiative or the innovation comprises a pair of transition sunglasses that changes color with sunlight effects. The initiatives tracking device 602 performs one or more of the operations as discussed above using one or more of the modules and engines as discussed above on the parent innovation 604 to yield a sub-innovation corresponding to the parent innovation 604. For example, a resulting sub-innovation comprises an air conditioner unit that changes temperature settings based on an external environment temperature and moisture content. The similarity relationship thread between the innovation and the sub-innovation in the example herein is an external environment transition. The similarity relationship of the external environment transition allows developing or tracking of a plurality of sub-innovations in a hierarchical series such that each corresponding sub-innovation derived from a respective parent innovation bears the same similarity relationship. The respective sub-innovations are derived by eliminating, unifying, copying, or rearranging attributes or elements in the respective parent innovation 604 within the hierarchical series. In other embodiments, various other examples may be possible without limitations based on the innovation and the various operations performed on the parent innovation 604.

The hierarchical series may include a parent innovation and a first sub innovation at the level two of the series after unification operation on the parent innovation. The hierarchical series may include a second sub-innovation at the level two of the series after elimination operation on the parent innovation. The hierarchical series may include a first sub-innovation at the level three of the series obtained after performing copying operation on the second sub-innovation at the level two series. The hierarchical series may further include a second sub-innovation at the level three series obtained after performing rearrangement operation on the second sub-innovation at the level two series. The hierarchical series may further include a third sub-innovation at the level three of the series obtained after performing copying or elimination operation on the first sub-innovation at the level two series. In a similar manner, a plurality of innumerable sub-innovations may be derived by the parent innovation(s). The tracking device 602 thus provides a multi-level and series-based facility to track or develop a plurality of sub-innovations by the parent innovation(s) by applying one or more operations using one or more of the modules as discussed above. In some other embodiments, still other operations may be employed other than those discussed above. For example, in an embodiment other operations may include, without limitations, reversing of an initiative through multiple stages to yield change at one or more of the reversed stages.

In an embodiment, an innovation comprises a pair of transition sunglasses that changes color with sunlight effects. A resulting sub-innovation comprises an air conditioning unit that changes temperature settings based on an external environment temperature and moisture content. The similarity relationship thread between the innovation and the sub-innovation is an external environment transition. The similarity relationship of the external environment transition allows developing or tracking a plurality of sub-innovations in a hierarchical series such that each corresponding sub-innovation derived from a respective parent innovation bears unique and different similarity relationships. The respective sub-innovations are derived by eliminating, unifying, copying, or rearranging attributes or elements in the respective parent inventions within the hierarchical series. In the example above, the unique and different similarity relationships in the series between an innovation and a sub-innovation include the external environment transition such that the innovation and its respective sub-innovation exhibit an innovative change by sensing an impact due to the external environmental transition.

In another example, the unique and different similarity relationship in the series between an innovation and a sub-innovation includes weight such that the innovation and its respective sub-innovation exhibit an innovative change by sensing an impact due to an inherent weight of an element.

In still another example, the unique and different similarity relationship between an innovation and a sub-innovation includes physical sensation such that the innovation and its respective sub-innovation exhibit an innovative change by sensing an impact due to the physical sensation of a body from an element or event.

In still another example, the unique and different similarity relationship between an innovation and a sub-innovation includes occurrence of an event such that the innovation and its respective sub-innovation exhibit an innovative change by sensing an impact due to the occurrence of the event.

In still another example, the unique and different similarity relationship between an innovation and a sub-innovation includes shape such that the innovation and its respective sub-innovation exhibit an innovative change by sensing an impact due to the shape of an element.

In still another example, the unique and different similarity relationship between an innovation and a sub-innovation includes optics such that the innovation and its respective sub-innovation exhibit an innovative change by sensing an impact due to optical attributes.

In still another example, the unique and different similarity relationship between an innovation and a sub-innovation includes element count such that the innovation and its respective sub-innovation exhibit an innovative change by sensing an impact due to a change in the element count.

In still another example, the unique and different similarity relationship between an innovation and a sub-innovation includes angular orientations such that the innovation and its respective sub-innovation exhibit an innovative change by sensing an impact due to a change in the angular orientations.

In still another example, the unique and different similarity relationship between an innovation and a sub-innovation includes size of an element such that the innovation and its respective sub-innovation exhibit an innovative change by sensing an impact due to a change in the element size.

In still another example, the unique and different similarity relationship between an innovation and a sub-innovation includes speed such that the innovation and its respective sub-innovation exhibit an innovative change by sensing an impact due to speed of an element. Still, there may be various other similarity relationships between an innovation and its respective sub-innovation. Any of these various similarity relationships discussed here may be kept constant during innovation tracking so as to result in a sub-innovation with the same similarity relationship as its parent innovation.

In an example, the processing circuit 112 as shown in FIG. 1 may be coupled to the tracking device 602 and a memory circuit (not shown) for storing programmed instructions that perform defined tasks of elimination, unification, copying and rearrangement within one or more attributes or elements of the parent innovation to derive a plurality of sub-innovations different in one or both of obviousness and novelty and bearing at least one similarity relationship with the parent innovation. In an example, the derived sub-innovations include a first sub-innovation derived from the parent innovation with a similarity relationship between the first sub-innovation and the second sub-innovation, the derived sub-innovations further includes a second sub-innovation derived from the first sub-innovation based on a similarity relationship between the second sub-innovation and the first sub-innovation. The first similarity relationship and the second similarity relationship are different. The derived sub-innovations further include a third sub-innovation derived from the second sub-innovation based on a third similarity relationship between the second sub-innovation and the third sub-innovation such that the third similarity relationship is different from the first and second similarity relationships. The parent innovation, first sub-innovation, second sub-innovation, and the third sub-innovation are non-obvious and novel among themselves.

The tracking device 602 may further include a mapping engine 616 that develops an initiatives map including the parent innovation 604 and the sub-innovations 608*a* and 608*b* along with their similarity relationships to define relationship trends in the series of the tracked innovations at each level of the series. The processing circuit 112 may use the relationships trends and the map to further evolve the mechanism of tracking and developing the sub-innovations 608*a* and 608*b* from a parent innovation 604. The processing circuit 112 may utilize the trends and the map as a template for defining sub-innovations and evaluating the sub-innovations based on obviousness and novelty criteria and various other criteria.

Figure 7:
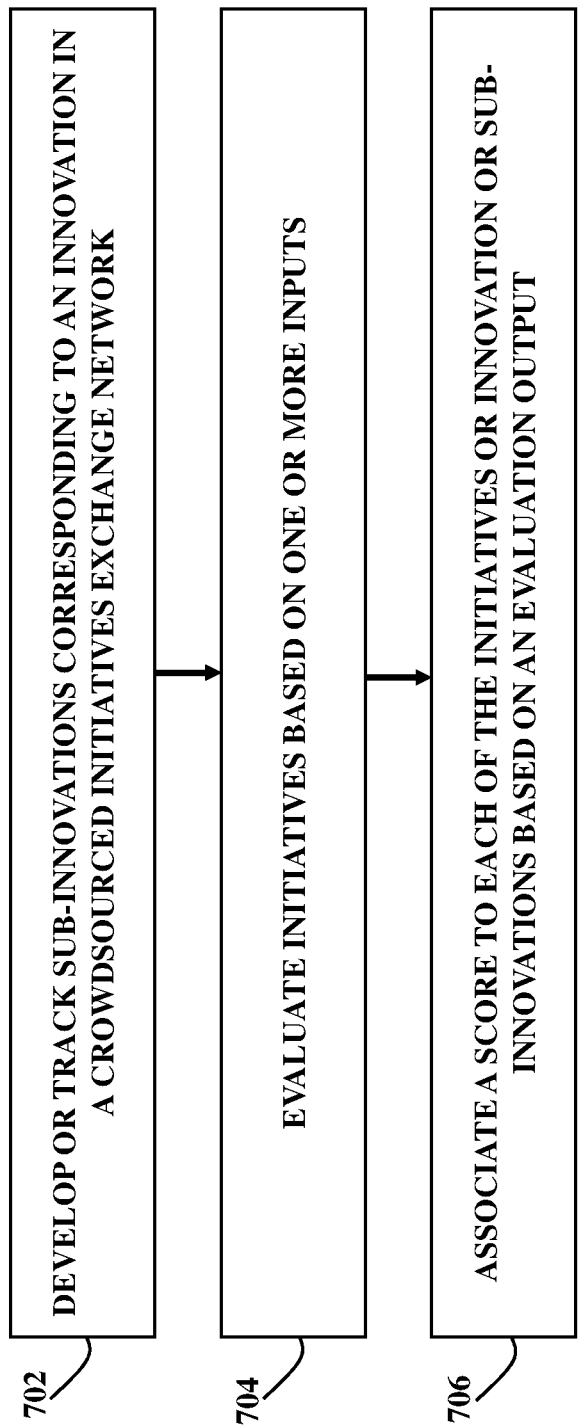
FIG. 7 is a flowchart illustrating a method in accordance with an embodiment herein.

FIG. 7, with reference to FIGS. 1 through 6, is a flowchart illustrating a method for tracking or developing and scoring of sub-innovations from an innovation in the initiatives exchange ecosystem 100. The method includes, at block 702, developing or tracking sub-innovations corresponding to an innovation in the crowdsourced initiatives exchange network 104. The initiatives are developed or tracked by performing a set of automated tasks aiming to change configurations of a parent innovation 604 in at least one of the attributes or elements such that the resulting sub-innovation 608*a* or 608*b* is different from the parent innovation 604 in at least one of a set of defined categories. The define categories may include, without limitations, physical property, chemical property, biological property, end usage, functionality, portability, cost effectiveness, and product type. In an embodiment, the sub-innovations may bear a similarity relationship thread with the parent innovation 604.

At block 704, the method includes evaluating the initiatives (sub-innovations) based on one or more inputs. The one or more inputs may include, without limitations, a credentialed score, officiality, and reputation of the innovator, novelty search output, non-obviousness decision, significance of the initiatives for a target agency, revenue potential, and market coverage, and the like. At block 706, the method includes associating a score to each of the initiatives or innovation or sub-innovations based on an evaluation output.

In some embodiments, the method may further include determining the credentialed expertise of an innovator based on responses from crowdsourced respondents or experts such that the crowdsourced respondents respond to federated profiles associated with the innovator and credential the innovator. The credentialing of each of the federated profiles associated with the innovator contribute to credentialing of an entire common profile of the innovator upon collation of the credentialed federated profiles. A crowdsourcing index may be associated with the credentialing process that is indicative of a degree of crowdsourcing such that the degree of crowdsourcing non-linearly affects the degree of credentialing. The method may further include fragmenting the profile of the innovator into the federated profiles by the segmenting or federation engine 310 based on commonalities in content of the federated profiles. The federated profiles may be treated as distinct profiles associated with the innovator.

In some embodiments, the tracking of sub-innovations 608*a* and 608*b* from a parent innovation 604 may include removing seemingly essential elements or attributes from the parent innovation 604 such that the sub-innovations 608*a* and 608*b* have at least one element reduced from the innovation and results in a tangible product that is different from the parent innovation 604 in at least one of the categories including physical property, chemical property, biological property, end usage, functionality, portability, cost effectiveness, and product type. In some embodiments, the tracking of sub-innovations 608*a* and 608*b* from a parent innovation 604 may include adding seemingly dissimilar and unrelated attributes or elements with the parent innovation 604 such that the sub-innovations 608*a* and 608*b* have at least one element or attribute added to the parent innovation 604 and results in a tangible product that is different from the parent innovation 604 in at least one of the categories including physical property, chemical property, biological property, end usage, functionality, portability, cost effectiveness, and product type. In some embodiments, the tracking of sub-innovations 608*a* and 608*b* from a parent innovation 604 may include copying attributes or elements of a parent innovation 604 and making alterations into it to result in a sub-innovation 608*a* or 608*b* that is different from the parent innovation 604 in at least one of the categories including physical property, chemical property, biological property, end usage, functionality, portability, cost effectiveness, and product type. In some embodiments, the tracking of sub-innovations 608*a* and 608*b* from a parent innovation 604 may include eliminating attributes or elements of a parent innovation 604 and rearranging them in a substantially different manner to result in a sub-innovation 608*a* or 608*b* that is different from the parent innovation 604 in at least one of the categories including physical property, chemical property, biological property, end usage, functionality, portability, cost effectiveness, and product type. The rearrangement may be of a physical or a chemical type such that the physical rearrangement results in a different physical product and a chemical rearrangement results in a different molecule or compound. In some embodiments, the various tasks may be performed by the initiatives tracking device that may be coupled to or be included within the processing circuit 112. The processing circuit 112 may further be coupled to the memory circuit 124.

In accordance with an embodiment, the computing terminals may be configured to either allow access to the computing device to track and or retrieve the computer executable files containing the innovations and the sub-innovations stored at the computing terminals 102 or may be configured to submit the computer executable files proactively to the computing device 106 for managing the innovations and sub-innovations. In such cases, the ecosystem 100 may be configured to verify integrity of innovators' submissions by providing extra capabilities for secured access, integrity verification, identity validation, and ownership management.

Figure 8:
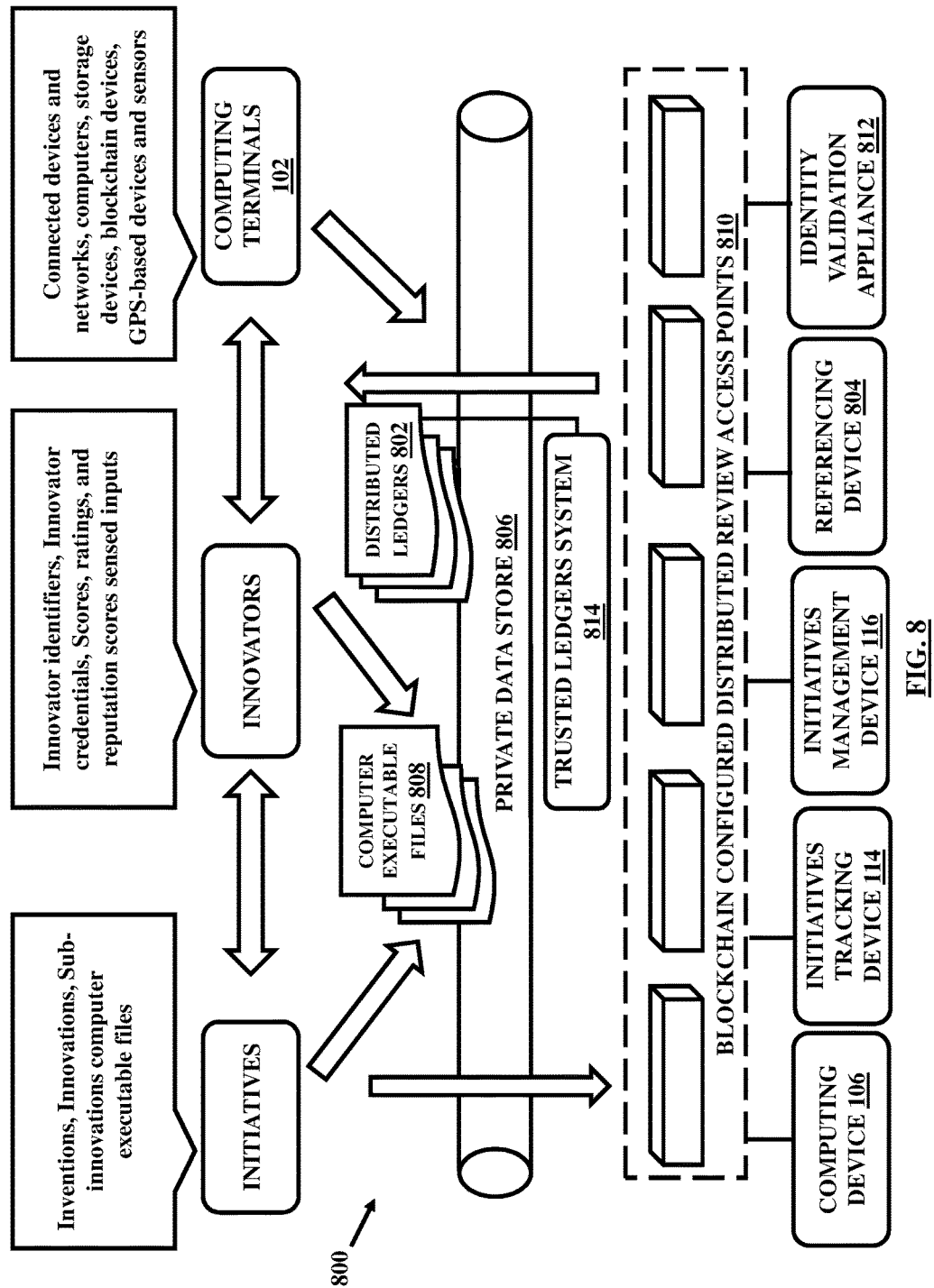
FIG. 8 illustrates a blockchain computer architecture of the ecosystem of FIG. 1 in accordance with an embodiment herein.

FIG. 8, with reference to FIGS. 1 through 7, illustrates an exemplary blockchain configured ecosystem architecture 800 containing one or more components of the ecosystem 100 as discussed in conjunction with FIG. 1 and also contain additional components so as to allow verification of integrity and identity of submission of the innovations and the respective innovators and also allow verification of the time and location of the innovators and the innovations. This may facilitate association of an identity and ownership to the innovations and also define a geographical and temporal identity such as when and in which country an innovation originated. The blockchain configured ecosystem architecture 800 may provide a crowdsourced integrity network for innovations management instead of completely relying on a central authority such as a patent office or an intellectual property office to manage the innovations and monitor time and country of conceptualization of the innovations and accordingly define priority dates and countries.

The ecosystem architecture 800 may be blockchain configured involving various blockchain devices. For example, the computing device 106 and the various computing terminals 102 may also be blockchain configured. The network 104 may be a blockchain integrity network. The blockchain network 104 may build trust among the various parties such as the innovators and their associated computing terminals 102 even if the devices/terminals 102 may not know one another. For example, the computing device 106 may not know all the computing terminals 102 or a first computing terminal may not know a second computing terminal. Even then, the blockchain devices and the network 104 may allow connections and transactions in a trusted mode. A record of transactions and data from the terminals/devices 102,106 stored on the blockchain in the form of computer executable distributed ledgers 802 may provide proof to command the necessary trust among the terminals/devices 102,106 to cooperate through a peer-to-peer or peer-to-client distributed digital ledger technology. The ecosystem architecture 800 may include a distributed trusted ledgers system 814 containing the distributed blockchain ledgers 802 associated with the plurality of computing terminals 102 such that each ledger 802 stores a copy of the computer executable files 808 containing the innovations and trust notes for defining security and trust among the computing terminals 102 so that each computing terminal trusts the other computing terminal through blockchain. The distributed ledgers system 814 enables coding of rules-based contracts that execute when specified conditions are met. The distributed ledgers 802 make it easier to create cost-efficient networks where any device or any innovation or sub-innovation may be tracked, without requiring a central point of control.

The various computing terminals 102 serve as distributed peer-to-peer nodes and connections. The computing device 106 may serve as a client device configured to perform the task of validating and relaying transactions such as involving tracking of the innovations, receipt and submission of the innovations and sub-innovations, and the like. Each terminal/device/node 102,106 in the ecosystem architecture 800, etc. may get a copy of the blockchain which may get downloaded automatically upon joining the blockchain integrity network such as the network 104. Every node or the computing terminal 102 is an administrator of the blockchain, and may join the network 104 voluntarily so that the network 104 is decentralized.

The blockchain may eliminate the risks that come with data being held centrally by storing data across the network 104 which may include the computer executable files 808 containing the innovations and sub-innovations. The blockchain security use encryption technology and validation mechanisms for security and integrity verification. The security may be enabled through public and private keys. A public key may define a user's address on the blockchain. The private key may give its owner an access to various digital assets in the network 104.

In an embodiment, the distributed ledgers 802 may enable coding of simple contracts that will execute when specified conditions are met. These smart contracts may protect intellectual property and ownership rights associated with the innovations and sub-innovations and eliminate the risk of files copying and redistribution without protecting rights for intellectual properties.

The blockchain configured ecosystem architecture 800 may be configured to discover, understand, and validate external innovations that originate away from an enterprise or a central authority or a central server such as the computing device 106. The initiatives tracking device 114, as discussed above, may be configured to track the innovations and sub-innovations from outside the computing device 106. The blockchain configured distributed ledgers 802 may allow each of the computing terminals 102 to trust one another and maintain documentation of the innovations and the sub-innovations. Each distributed ledger 802 may create a computer executable distributed trust note for verification of the innovations. The trust note may define where an innovation came from and at what time.

The blockchain configured ecosystem architecture 800 may include a referencing device 804. The referencing device 804 may be communicatively and/or operatively coupled to the processing circuit 112 (shown in FIG. 1). In an embodiment, the referencing device 804 may be coupled to the initiatives tracking device 114 and the central initiatives management device 116. The referencing device 804 may be configured to determine correlationship and referencing of a tracked innovation with other innovations such as how many other innovations and or other references have discussed or spoken about the tracked innovation. The processing circuit 112 may be configured to utilize the number of references and type of references as a parameter to score the innovation.

The processing circuit 112 or its components thereof may be configured to use any of the automated tasks as described above such as elimination, unification, and rearrangement within one or more attributes or elements of the tracked innovation to derive a plurality of sub-innovations so that the processing circuit 112 may perform data aggregation to discover if the sub-innovations exist elsewhere and determine whether the tracked innovation is novel and non-obvious. If upon performing the automated tasks, any of the sub-innovation is found to exist even if it is different from the tracked innovation in one or more features, the innovation may be scored lower on novelty and obviousness as compared to an innovation where even the sub-innovations may not exist elsewhere. Through this approach, the distributed ledger-based blockchain configured ecosystem architecture 800 may facilitate a distributed innovation trust network (ITN) so that the nodes or the computing terminals 102 in the ITN may trust one another and the ledgers 802 be used as a trusted source for innovation without relying on a single authority such as a central patent or intellectual property office. In this manner, the trusted ledgers 802 in the ITN may serve as a source of trusted information for generating innovation references such as priority dates, priority countries, source of innovation, ownership rights, and the like.

In an embodiment, the blockchain configured ecosystem architecture 800 may be configured to track the innovations or receive the submitted innovations (as discussed above) and generate the sub-innovations with the use of the various components as discussed in conjunction with FIG. 1 so that the sub-innovations differ in one or more properties. The blockchain configured ecosystem architecture 800 may be configured to further perform tracking of the sub-innovations to compare if any of the sub-innovations 608a and 608b match its parent innovation 604 so as to assess novelty and obviousness of the innovation. The blockchain configured ecosystem architecture 800 may be configured to search its own data store of the innovations such as the asset library 118 to analyze novelty of the innovation. In this way, an assessment of the innovation may be performed through an automated mechanism using certain predefined automated processes employing machine learning tools for the computing device 106 to perform assessment, screening, and short-listing of the innovations more efficiently and faster.

The process and the blockchain configured ecosystem architecture 800 may facilitate innovation management in cases where external innovations are generated and tracked in a crowdsourced manner or through external agencies such as a university technology transfer office or any outside company. The ecosystem architecture 800 may facilitate not only tracking of the innovations but also proper assignments to owners of the innovations at a recorded date.

In an embodiment, the blockchain configured ecosystem architecture 800 may facilitate provisions for confidentiality such as to allow the nodes or the computing terminals 102 to access content of the computer executable files 808 containing the innovations in a controlled way. For example, in an embodiment, only headers or titles may be viewable by the nodes and the remaining content may be kept confidential to be viewed only by a central examining authority unless made public by it or by authorities who may be allowed an access by the owner of the innovation under a non-disclosure agreement. Similarly, various other embodiments for varying access levels may be possible without limitations.

In an example, the blockchain configured ecosystem architecture 800 and the ITN may be defined to trust all the computing terminals 102 and not just an intellectual property office to record and document the innovations and corresponding intellectual property rights.

The blockchain configured ecosystem architecture 800 may provide a private view to the computing terminals 102 and the computing referred to as private data store 806 so that each computing terminal 102 or the computing device 106 may privately access the computer executable files 808 containing the innovations based on various policies such as based on their respective identities and intellectual property ownership or the authority of examination and review of the innovations by an accepting authority of the submissions. Each of the computing terminals 102 and/or the computing device 106 may access the computer executable files 808 through the dedicated private store 806 available through the plurality of distributed blockchain configured access points 810 which may be enabled in the form of distributed blocks as shown in FIG. 8, with each block providing a facility to access the features of the blockchain configured ecosystem architecture 800 by the multiple computing terminals 102 and the computing device 106 at the same time based on defined and granted access rights.

The private data store 806 may provide a virtual storage to facilitate interaction, information exchange, reviewing, and presentation of the computer executable files 808 containing the innovations. For example, the private data store 806 may allow a virtual storage and presentation of only limited executable files or portions of the executable files 808 for access by particular nodes in accordance with permissions granted for reviewing. The private data store 806 may be configured to auto-hash review interactions at any required interval. This compartmentalization of the computer executable files 808 ensures that the computer executable files 808 are secured and private as per access rights authorized to the nodes. The data presented on the private data store 806 of the blockchain serves as a secure way to ensure that the private data store 806 is in sync with any permissioned access.

In an embodiment, the blockchain configured digital ecosystem architecture 800 may provide a federated blockchain comprising of several entities/participants and associated computers and devices and sensors that jointly create and/or submit the innovations and attempts to process transfers of data through a trusted, secured and distributed network of the blockchain configured access points. Federations may be organized by systems of care such as identified by geography; e.g. community or state. The computing terminals 102 may be assumed to stay within these systems of care that cross organizations. In an example, the federated blockchain may be applied on top of an existing health information exchange community as a way to further reduce costs and help the community reach financial sustainability.

In accordance with an embodiment, the computing device 106 may access the computer executable files 808 for review and verification and scoring of the innovations based on authorization and access rights granted which may dynamically be updated. The blockchain configured ecosystem architecture 800 may include an identity validation appliance 812 (as discussed hereafter in conjunction with FIG. 9) which may be configured to validate the identity of the computing terminals 102 submitting the innovations and or producing the innovations. The blockchain configured identity validation appliance 812 may utilize a variety of identity validation algorithms and schemes such as but not limited to facial expressions, geographical coordinates, geo-tags, gestures, muscle activity, and the like. In accordance with a specific type of validation scheme utilized by the blockchain validation device 812, a validation scheme-based device may be utilized as discussed above.

Figure 9:
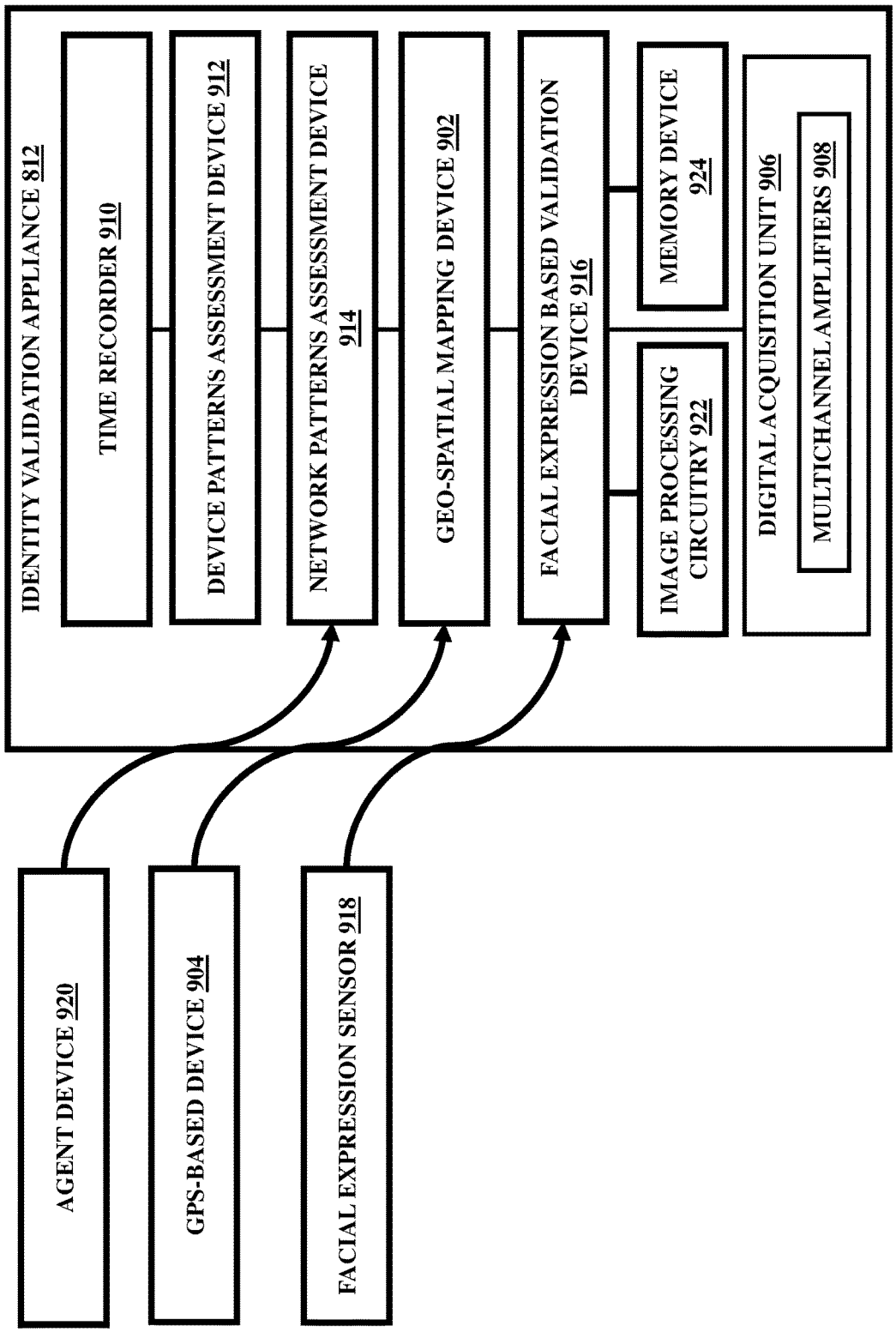
FIG. 9 illustrates a computerized identity validation appliance in accordance with an embodiment herein.

FIG. 9, with reference to FIGS. 1 through 8, illustrates the identity validation appliance 812 for advanced identity management of the innovators and the innovations and the associated computing terminals 102 on the web. The identity validation appliance 812 may be integrated with the blockchain configured ecosystem architecture 800 as shown in FIG. 8. The distributed ledgers 802 may offer enhanced methods for proving the identities along with the possibility to digitize personal documents. The ecosystem 100 may include the blockchain configured identity validation device 812 for verifying identity of the computing terminals 102, associated (tracked or submitted) innovations and innovators, spatio-temporal coordinates indicative of respective time and geographical identities of the innovators and the innovations.

The identity validation device 812 includes a geo-spatial mapping device 902 to perform geo-tagging of the computing terminals 102 and the computer executable files 808 containing the innovations and sub-innovations and associating a geographical identity to the innovators, and the respective innovations and sub-innovations to define such as geographical origin of the innovations. The geo-tagging may allow identifying local geo-tags associated with a submission from an innovator which may be compared, in an example, with pre-stored geo-spatial information about the innovator for processing identity validation. The geo-tagging is performed based on geo-spatial information received from a global positioning system (GPS)-based device 904 from respective computing terminals 102 in the form of electric signals. There may be a plurality of GPS-based devices so that a GPS-based device 904 may be coupled to every computing terminal 102. The GPS-based devices 904 may be blockchain configured and a respective go-identity and the identity of the respective GPS-based device 904 may be maintained in the distributed ledgers 802 of the blockchain.

The identity validation appliance 812 may include a digital acquisition unit 906 and multichannel amplifiers 908 operatively coupled to the geo-spatial mapping device 902 and communicatively connected to the GPS-based devices 904 and configured for pre-processing and amplification of the electric signals received from the GPS-based devices 904 associated with the computing terminals 102.

The identity validation appliance 812 may further include a time recorder 910 to determine a time value according to receipt and tracking of an innovation or its sub-innovations.

The time recorder 910 may be configured to create a time identifier (ID) for the innovation to define metadata indicative of temporal coordinates of the innovations and/or respective sub-innovations. This information may, for example, be used to associate a priority date for concerned intellectual properties.

In some embodiments, the identity validation appliance 812 may include a device patterns assessment device 912, a network patterns assessment device 914, and a facial expression-based validation device 916. The blockchain configured identity validation appliance 812 may use inputs and vocabularies stored in a memory circuit such as the memory circuit 124 shown in FIG. 1 to identify rules and accordingly execute advanced blockchain validation mechanisms to verify identities of the computing terminals 102 and associated innovations through the distributed blockchain configured ecosystem 100.

The blockchain configured identity validation appliance 812 may include a non-volatile computer-readable memory and a processor which may be configured to receive a private key from the computing terminals and the computing device 106. The computing terminals 102 and the computing device 102 may be authorized to review the innovations privately using the private key as per authorization. One of ordinary skill in the art would recognize there may be a variety of different proof standards that could be used by the blockchain configured identity validation appliance 812. The proof standard may be based on proof of work, such as hash value requirements, proof of stake, such as a key or other indicator of consensus, or any other kind or proof of consensus. The proof standard may be applied as a rule that may require a hash value to be less than the proof standard, more than the proof standard, or have a required bit sequence or a required number of leading or trailing zeroes. Any proof standard may be used without departing from the spirit and scope of the present invention.

The blockchain configured identity validation appliance 812 may be configured to validate identity of the computing terminals 102 and the computing device 102 accessing the innovations to establish a trusted information review and interaction. The blockchain configured identity validation appliance 812 may utilize a variety of identity validation algorithms and schemes such as but not limited to facial expressions, geographical coordinates, geo-tags, gestures, muscle activity, and the like. In accordance with a specific type of validation scheme utilized by the blockchain configured identity validation appliance 812, a validation scheme-based device may be utilized. Few embodiments, in particular, are discussed herein in conjunction with FIG. 9 that provide for the use of geo-spatial mapping, facial expression, network patterns assessment, device patterns assessment for validation of identities of the computing terminals 102 and the computing device 106.

In an embodiment, the blockchain configured identity validation appliance 812 may obtain geographical coordinates associated with the computing terminals 102 and the computing device 106 from respective global position systems (GPS)-based devices 904 associated with the computing terminals 102 and the computing device 106. The blockchain configured identity validation appliance 812 may tag the computer executable files using geo-tags to establish a geographical identity with the innovations. The geo-tags may be used to validate identity of the computing terminals 102 and the computing device 106 in some cases for validating identity of the central authority managing the innovations. The geo-spatial mapping device 902 may perform geo-tagging of the computing terminals 102 and the computing device 106 and the innovations and also compare the geo-tags with pre-stored information about the computing terminals 102 and the computing device 106 for processing validation to grant access rights.

In an embodiment, the blockchain configured identity validation appliance 812 may extract information pertaining to facial expressions of an innovator from an associated facial expression sensor 918. The facial expression sensor 918 may be of a variety of types to identify and sense a variety of facial expressions. The sensed facial expressions may be communicated to the blockchain configured identity validation appliance 812 which may be used by the facial expression-based validation device 916 of the blockchain configured identity validation appliance 812 to perform processing of the sensed facial expressions and verify the identity in accordance with predefined facial patterns of the innovators stored in the memory circuit 124. The facial expression based validation device 916 may be operatively connected to image processing circuitry 922 and a memory device 924 to interpret the micro facial expressions and compare them with predefined facial patterns to validate innovators' identity.

The facial expression sensor 918 (also referred to as face recognition sensor interchangeably) may perform automatic face recognition for surveillance, security, authentication or verification purposes. Information detected by the facial expression sensor 918 may not only expose sensation or passion but may also be used to judge mental views and psychosomatic aspects. The facial expression sensor 918 may employ one or more of different techniques such as motion-based approach, muscle-based approach, or any other approach without limitations. These approaches may involve analysis of aspects originating from bones, tissues, skin, muscles, deformities, contractions, expansions, etc. The facial expression sensor 918 may sense the information and transmit the sensed information to the facial expression-based validation device 916 of the blockchain configured identity validation appliance 812 so that the blockchain configured identity validation appliance 812 may identify and verify the computing terminals 102 and the computing device 106 interacting with the blockchain configured ecosystem architecture 800 based on pre-defined parameters signifying complex facial expressions for genuineness and fraud. These pre-defined parameters and related details may be stored in the memory circuit 124 associated with the blockchain configured identity validation appliance 812.

The network patterns assessment device 914 may process network information, metadata information, and other network queries and compare with pre-stored fake network patterns and individual network patterns based on historical data and usage preferences, and generate an output indicative of whether an identity is verified.

The network information, metadata information, and other network queries may be extracted by an agent device 920 and transmitted to the network patterns assessment device 914 for further processing and verification of identity. In an embodiment, the agent device 920 may watch browser and network behavior and aggregated behavioral and network information may be submitted to the blockchain configured identity validation appliance 812 as and when an innovation is tracked or submitted. The behavioral information may be used by the blockchain configured identity validation appliance 812 to validate whether the behavior exhibited is in accordance with a preferred and routine behavior as pre-stored in the memory circuit 124. In an example, the agent device 920 may extract the network information and periodically (or as and when a review is made) update the blockchain configured identity validation appliance 812 about the network information. The blockchain configured identity validation appliance 812 may, for example, validate whether the network connections are permissible for the particular computing terminal 102 that submits the innovation or is coming from a suspicious network.

In an example, the agent device 920 may extract device information and transmit the device information to the device patterns assessment device 912. The device information may include information such as model, serial number, and other information of a computing terminal 102 associated with an innovator. The device patterns assessment device 912 may compare the device information received from the agent device 920 with pre-stored device information about the computing terminal 102 and associated innovator based on historical data or usage preferences or based on pre-defined submitted device information by the innovator.

The blockchain configured identity validation appliance 812 may include the digital acquisition unit 906 to receive and process signals containing the sensed contextual information from the GPS-based devices 904, facial expression sensor 918, and the agent device 920. The digital acquisition unit 906 may be configured to perform real-time assessments of the sensed received contextual information. The digital acquisition unit 906 may include a plurality of multichannel amplifiers 908. Each amplifier of the multichannel amplifiers 908 may be defined to receive a specific type of sensed information from a particular type of sensor and device. The amplified signals obtained from the plurality of multichannel amplifiers 908 are then transmitted to respective processors such as the device patterns assessment device 912, network patterns assessment device 914, geospatial mapping device 902, and the facial expression-based validation device 916. The digital acquisition unit 906 may be implemented using an integrated circuit.

In an example, the embodiments herein may provide a computer program product configured to include a pre-configured set of instructions, which when performed, may result in actions as stated in conjunction with the method(s) described above. In an example, the pre-configured set of instructions may be stored on a tangible non-transitory computer readable medium. In an example, the tangible non-transitory computer readable medium may be configured to include the set of instructions, which when performed by a device, may cause the device to perform acts similar to the ones described here.

The embodiments herein may comprise a computer program product configured to include a pre-configured set of instructions, which when performed, may result in actions as stated in conjunction with the methods described above. In an example, the pre-configured set of instructions may be stored on a tangible non-transitory computer readable medium or a program storage device. In an example, the tangible non-transitory computer readable medium may be configured to include the set of instructions, which when performed by a device, may cause the device to perform acts similar to the ones described here. Embodiments herein may also include tangible and/or non-transitory computer-readable storage media for carrying or having computer executable instructions or data structures stored thereon.

Generally, program modules include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The techniques provided by the embodiments herein may be implemented on an integrated circuit chip. The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chip may be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product may be any product that includes integrated circuit chips, ranging from toys and other low-end applications to advanced computer products having a display, a keyboard or other input device, and a central processor.

The embodiments herein may include both hardware and software elements. The embodiments that are implemented in software include but are not limited to, firmware, resident software, microcode, etc.

A data processing system suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) may be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 10:
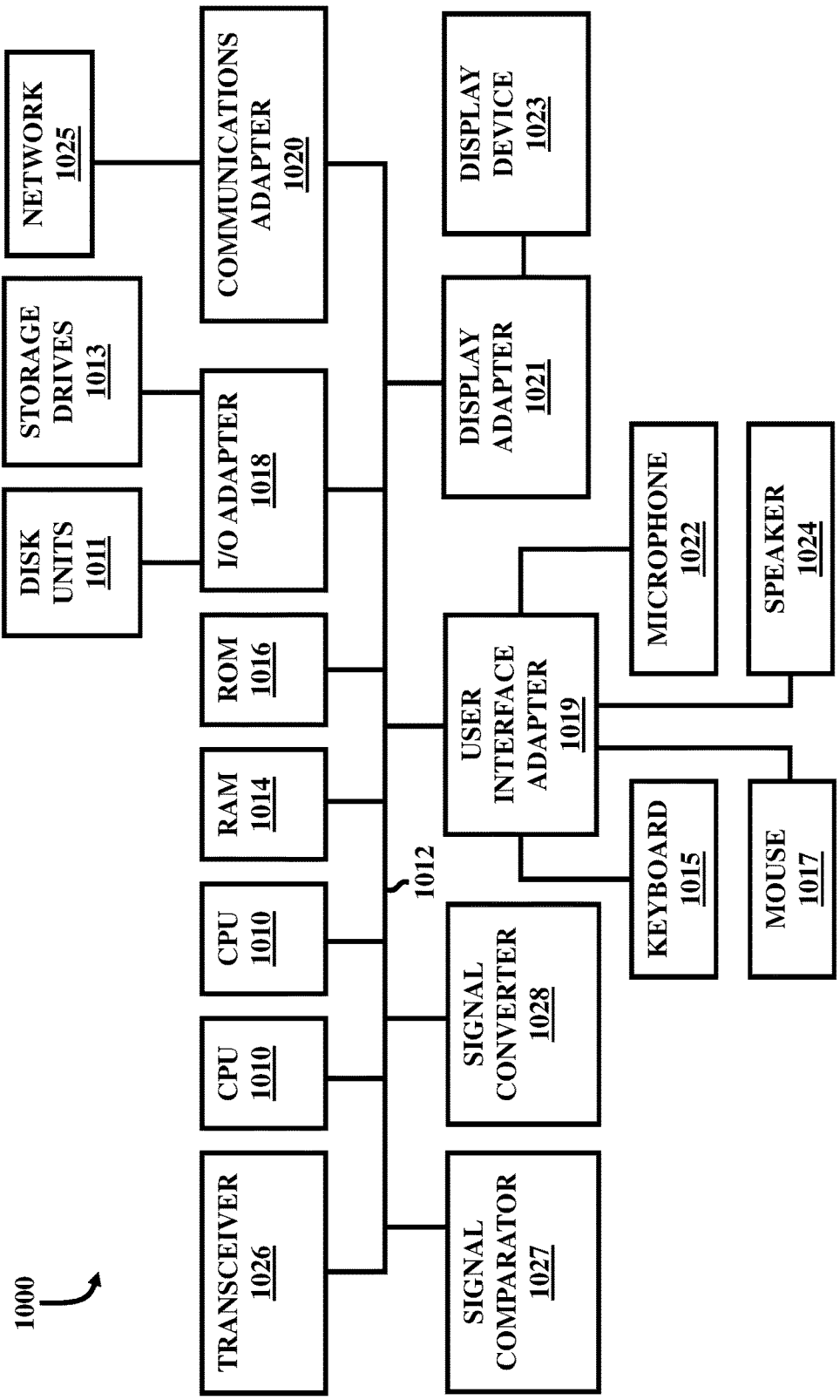
FIG. 10 illustrates a computer system used in accordance with an embodiment herein.

A representative hardware environment for practicing the embodiments herein is depicted in FIG. 10, with reference to FIGS. 1 through 9. This schematic drawing illustrates a hardware configuration of an information handling/computer system 1000 in accordance with an exemplary embodiment herein. The system 1000 comprises at least one processor or central controller (CPU) 1010. The CPUs 1010 are interconnected via system bus 1012 to various devices such as a random access memory (RAM) 1014, read-only memory (ROM) 1016, and an input/output (I/O) adapter 1018. The I/O adapter 1018 may connect to peripheral devices, such as disk units 1011 and storage drives 1013, or other program storage devices that are readable by the system. The system 1000 may read the inventive instructions on the program storage devices and follow these instructions to execute the methodology of the embodiments herein. The system 1000 further includes a user interface adapter 1019 that connects a keyboard 1015, mouse 1017, speaker 1024, microphone 1022, and/or other user interface devices such as a touch screen device (not shown) to the bus 1012 to gather user input. Additionally, a communication adapter 1020 connects the bus 1012 to a data processing network 1025, and a display adapter 1021 connects the bus 1012 to a display device 1023, which provides a GUI (e.g., a gadget) in accordance with the embodiments herein, or which may be embodied as an output device such as a monitor, printer, or transmitter, for example. Further, a transceiver 1026, a signal comparator 1027, and a signal converter 1028 may be connected with the bus 1012 for processing, transmission, receipt, comparison, and conversion of electric or electronic signals.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein may be practiced with modification within the spirit and scope of the appended claims.

What is claimed is:

1. A blockchain configured distributed architecture-based crowdsourced initiatives exchange ecosystem comprising:
   a plurality of computing terminals associated with respective plurality of innovators which serve as sources of initiatives identified as innovations and respective sub-innovations stored in the form of computer executable files at said computing terminals of said innovators, wherein said plurality of computing terminals are communicatively connected over a crowdsourced initiatives exchange network;
   a distributed trusted ledgers system containing a plurality of distributed blockchain ledgers associated with said plurality of computing terminals such that each ledger stores a copy of said computer executable files containing said innovations and trust notes for defining security and trust among said computing terminals so that each computing terminal trusts the other computing terminal through blockchain, wherein said distributed ledgers system enable coding of rules-based contracts that execute when specified conditions are met;
   a computing device communicatively connected to said plurality of computing terminals through said crowdsourced initiatives exchange network and configured to access privately said computer executable files stored at said plurality of computing terminals as said blockchain ledgers to source and monitor said innovations from an external system;
   a processing circuit communicatively coupled to said computing device and said plurality of computing terminals, said processing circuit comprising:
      an initiatives tracking device that tracks said innovations in said crowdsourced initiatives exchange network by accessing said distributed ledgers associated with said plurality of computing terminals such that said ledgers allow said computing device to review said computer executable files privately;
      a central initiatives management device comprising:
         an evaluation device for evaluating said innovations based on one or more inputs, wherein said one or more inputs are determined using a credentialed score of an innovator, a crowdsourcing index, a referencing index, an inventor reputation criterion, degree of overlap with a sub-innovation, wherein said crowdsourcing index comprises a non-linear relationship with a number of crowdsource respondents, and said referencing index signifies connections of said innovation with other references; and
         a scoring device for associating an innovation score to each of said innovations based on an evaluation output;
   a memory device containing an enterprise asset library to store said computer executable files tracked and extracted from said computing terminals and indicative of said innovations including computer executable initiatives documents, computer executable invention disclosures, computer executable innovator profiles, computer executable innovator credentialing details, computer executable said evaluation output, and computer executable said associated scores;
   a credentialing system that determines said credentialed score of said innovators and said crowdsourcing index, wherein said credentialing system comprises an auto-validation engine that certifies federated digital profiles associated with each of said innovators, wherein said federated digital profiles are retrieved from a social networking platform, wherein said auto-validation engine comprises application programming interfaces that allow said auto-validation engine to determine an extent of mapping between information contained in two distinct federated digital profiles associated with each of said innovators, wherein a first of the two distinct federated digital profiles is maintained by said social networking platform, wherein a second of the two distinct federated digital profiles is not maintained by said social networking platform, and wherein said credentialing system determines an aggregate score of a plurality of said innovators contributing towards said initiatives, wherein said credentialing system further comprising:
      a profile segmenting engine configured to segment digital profiles of said innovators into said federated digital profiles associated with each of said innovators;
      a segment certification engine configured to facilitate certification of said federated digital profiles associated with said innovators through a plurality of digital nodes representing crowdsourced respondents networked together in a digital architecture;
      a segment rating engine configured to associate ratings to credentialed federated profiles; and a profile rating engine configured to determine said credentialed score and associate with said respective profiles of said innovators based on said ratings, wherein said score is used by said evaluation device for evaluating identity of said innovators and respective innovations; and a hardware-based identity validation appliance to verify integrity of said plurality of computing terminals and said associated innovators to authorize a secured and private access of said plurality of computing terminals to said crowdsourced initiatives exchange network and to associate metadata with said innovations defining a digital ownership identity, a digital time identity, a digital geographical identity, wherein said hardware-based identity validation appliance comprises:

a geo-spatial mapping device to perform geo-tagging of said computing terminals and said computer executable files and compare said geo-tags with pre-stored geo-spatial information about said innovators for processing validation, wherein said geo-tagging is performed based on geo-spatial information received from a global positioning system (GPS)-based device from said respective computing terminals in the form of electric signals, wherein the GPS-based device is blockchain configured and an identity of the GPS-based device is maintained in the distributed blockchain ledgers; and a digital acquisition unit and multichannel amplifiers operatively coupled to said geo-spatial mapping device and communicatively connected to said GPS-based device and configured for pre-processing and amplification of said electric signals received from said GPS)-based device, wherein said hardware-based identity validation appliance further comprises a facial expression based validation device to receive data indicative of micro facial expressions extracted by respective facial expressions sensors associated with said computing terminals of said innovators, and wherein said micro expressions based validation device comprises an image processing circuitry and an associated memory to interpret said micro facial expressions and compare them with pre-defined facial patterns to validate an identity of said innovators.

2. The ecosystem of claim 1, further comprising a web platform including a graphical user interactive interface accessible through said computing device.

3. The ecosystem of claim 1, wherein said initiatives tracking device tracks sub-innovations for an innovation by removing one or more elements or attributes from said innovation such that said sub-innovations have at least one element reduced from said innovation and results in a tangible product that is different from said innovation in at least one of a physical property, a chemical property, and a biological property.

4. The ecosystem of claim 1, wherein said initiatives tracking device tracks sub-innovations for an innovation by adding dissimilar and unrelated attributes or elements with said innovation such that said sub-innovations have at least one element or attribute added to said innovation and results in a tangible product that is different from said innovation in at least one of a physical property, a chemical property, and a biological property.

5. The ecosystem of claim 1, wherein said initiatives tracking device tracks sub-innovations for an innovation by copying attributes or elements of said innovation and making alterations into it to result in a sub-innovation that is different from said innovation in at least one of a physical property, a chemical property, and a biological property.

6. The ecosystem of claim 1, wherein said initiatives tracking device tracks sub-innovations for an innovation by eliminating attributes or elements of said innovation and rearranging them to result in a sub-innovation that is different from said innovation in at least one of a physical property, a chemical property, and a biological property, and wherein the rearrangement is of a physical or a chemical type such that a physical rearrangement results in a different physical product from said innovation and a chemical rearrangement results in a different molecule or compound from said innovation.

7. The ecosystem of claim 1, wherein said memory device is configured to store programmed instructions that perform defined tasks of elimination, unification, and rearrangement within one or more attributes or elements of an innovation to derive a plurality of sub-innovations.

8. The ecosystem of claim 7, wherein the derived sub-innovations include a first sub-innovation derived from said innovation based on a first similarity relationship and a second sub-innovation derived from said first sub-innovation based on a second similarity relationship, wherein said first similarity relationship and said second similarity relationship are different, wherein said derived sub-innovations further including a third sub-innovation derived from said second sub-innovation based on a third similarity relationship between said second sub-innovation and said third sub-innovation such that said third similarity relationship is different from the first and second similarity relationships, and wherein said innovation, said first sub-innovation, said second sub-innovation, and said third sub-innovation are non-obvious and novel among themselves.

9. The ecosystem of claim 8, further comprising a mapping system that develops an initiatives digital map including said innovation and said sub-innovations along with their similarity relationships to define relationship trends.

10. The ecosystem of claim 1, wherein said processing circuit is configured to track said innovations from said external system not belonging to or integrated with said computing device by reading said distributed ledgers privately accessible by said computing device.

11. The ecosystem of claim 10, wherein said processing circuit is further configured to develop one or more sub-innovations of said innovations using a set of computer-controlled operations, and wherein said processing circuit is configured to track said one or more sub-innovations by reading said distributed ledgers associated with said plurality of computing terminals.

12. The ecosystem of claim 11, wherein said set of computer-controlled operations is configured to change configurations of said innovations in at least one of attributes or elements such that resulting sub-innovations are different from said innovations in at least a category comprising any of a physical property, a chemical property, and a biological property, and wherein respective sub-innovations are derived by any of eliminating, unifying, or rearranging attributes or elements in said respective innovations.

13. The ecosystem of claim 12, wherein each innovation and its respective sub-innovations are defined through a computer executable data structure stored in the form of a computer executable file such that said computer executable data structure associates a digital relationship between an innovation and its respective sub-innovations through relational structures maintained in said distributed trusted ledgers.

* * * * *